US012689987B2

(12) United States Patent
Liu et al.

(10) Patent No.: US 12,689,987 B2
(45) Date of Patent: Jul. 21, 2026

(54) WIDEBAND UE POWER SAVING BY SWITCHING WIDEBAND DATA TO NARROWBAND DATA WITH WIDEBAND REFERENCE SIGNAL

(71) Applicant: QUALCOMM Incorporated, San Diego, CA (US)

(72) Inventors: Kangqi Liu, San Diego, CA (US); Weimin Duan, San Diego, CA (US); Tingfang Ji, San Diego, CA (US); Jing Jiang, San Diego, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 18/508,113

(22) Filed: Nov. 13, 2023

(65) Prior Publication Data

US 2025/0159612 A1　May 15, 2025

(51) Int. Cl.
*H04W 52/02*　(2009.01)
*H04L 5/00*　(2006.01)

(52) U.S. Cl.
CPC ......... *H04W 52/0261* (2013.01); *H04L 5/005* (2013.01)

(58) Field of Classification Search
None
See application file for complete search history.

(56) References Cited

U.S. PATENT DOCUMENTS

| | | | | |
|---|---|---|---|---|
| 8,787,873 B1 * | 7/2014 | Hitt | .......................... | H04W 8/20 |
| | | | | 455/406 |
| 2013/0039319 A1 * | 2/2013 | Shi | .................... | H04L 27/26132 |
| | | | | 370/328 |
| 2016/0269244 A1 * | 9/2016 | Nalluri | ................ | H04L 41/0896 |
| 2018/0198594 A1 * | 7/2018 | Tiirola | .................. | H04L 5/0051 |
| 2019/0208482 A1 * | 7/2019 | Tooher | ............... | H04W 56/001 |
| 2020/0196342 A1 * | 6/2020 | Lin | ........................ | H04L 5/0048 |
| 2021/0127450 A1 * | 4/2021 | Abdoli | ............. | H04W 52/0216 |

(Continued)

OTHER PUBLICATIONS

International Search Report and Written Opinion—PCT/US2024/051281—ISA/EPO—Jan. 30, 2025.

(Continued)

*Primary Examiner* — Lonnie V Sweet
(74) *Attorney, Agent, or Firm* — Procopio, Cory, Hargreaves & Savitch LLP/Qualcomm

(57) ABSTRACT

The apparatus may be a wireless device configured to detect a first trigger condition at the wireless device and transmit, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth.

30 Claims, 15 Drawing Sheets

(56)　　　　　　References Cited

U.S. PATENT DOCUMENTS

| | | | | |
|---|---|---|---|---|
| 2022/0167317 A1* | 5/2022 | Zheng | ...................... | H04L 1/16 |
| 2023/0180199 A1* | 6/2023 | Jung | .................... | H04L 5/0053 |
| | | | | 370/329 |
| 2023/0224935 A1* | 7/2023 | Bienas | ................... | H04B 1/005 |
| | | | | 370/329 |
| 2024/0015596 A1* | 1/2024 | Condon | ........... | H04W 28/0983 |
| 2024/0106590 A1* | 3/2024 | Krips | ................... | H04L 5/0023 |
| 2024/0204969 A1* | 6/2024 | Wu | ....................... | H04L 5/0092 |
| 2024/0313999 A1* | 9/2024 | Portnik | ................ | H04L 1/1664 |
| 2024/0323940 A1* | 9/2024 | Harada | .............. | H04W 72/231 |
| 2025/0047562 A1* | 2/2025 | Mitra | ................... | H04W 24/02 |
| 2025/0081110 A1* | 3/2025 | Li | ..................... | H04B 7/06964 |

OTHER PUBLICATIONS

Kim T., et al., "Evolution of Power Saving Technologies for 5G New Radio", IEEE Access, IEEE, USA, vol. 8, Nov. 2, 2020, pp. 198912-198924, XP011819554, pp. 4, 5, section: B—Bandwidth adaptation; figure 3.

Qualcomm Incorporated: "Views on UE Power Saving", 3GPP TSG RAN WG1 Meeting #94, R1-1809462, 3rd Generation Partnership Project, Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018, XP051516827, 11 Pages, section 2.1, figure in p. 3, section 3, 3.2.

Samsung: "Framework to Support Bandwidth Parts in NR", 3GPP TSG-RAN WG2 NR #99bis Meeting, R2-1711187, Framework to Support Bandwidth Parts in NR_V0, 3rd Generation Partnership Project, Mobile Competence Centre, 650, Route Des Lucioles, F-06921 Sophia-Antipolis Cedex, France, vol. RAN WG2, No. Prague, Czech, Oct. 9, 2017-Oct. 13, 2017, Sep. 29, 2017, XP051355438, 8 Pages, section 2.1, Proposal 2.

* cited by examiner detect a first trigger condition at the wireless device transmit, for a network device, a first indication to switch from a first mode of operation associated with a first data bandwidth and a first reference signal bandwidth to a second mode of operation associated with a second data bandwidth and a second reference signal bandwidth

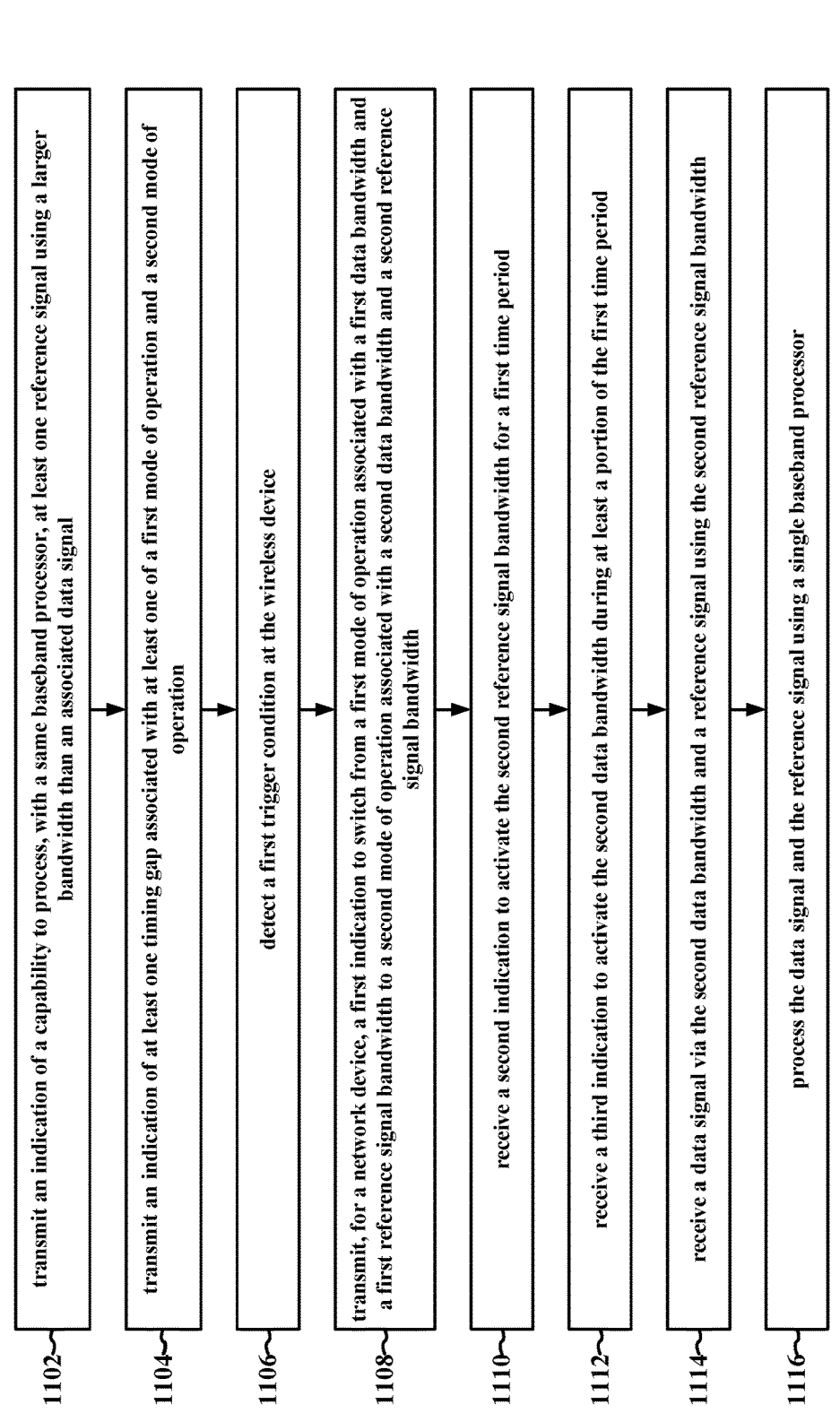

1102   transmit an indication of a capability to process, with a same baseband processor, at least one reference signal using a larger bandwidth than an associated data signal 1104   transmit an indication of at least one timing gap associated with at least one of a first mode of operation and a second mode of operation 1106   detect a first trigger condition at the wireless device 1108   transmit, for a network device, a first indication to switch from a first mode of operation associated with a first data bandwidth and a first reference signal bandwidth to a second mode of operation associated with a second data bandwidth and a second reference signal bandwidth 1110   receive a second indication to activate the second reference signal bandwidth for a first time period 1112   receive a third indication to activate the second data bandwidth during at least a portion of the first time period 1114   receive a data signal via the second data bandwidth and a reference signal using the second reference signal bandwidth 1116   process the data signal and the reference signal using a single baseband processor

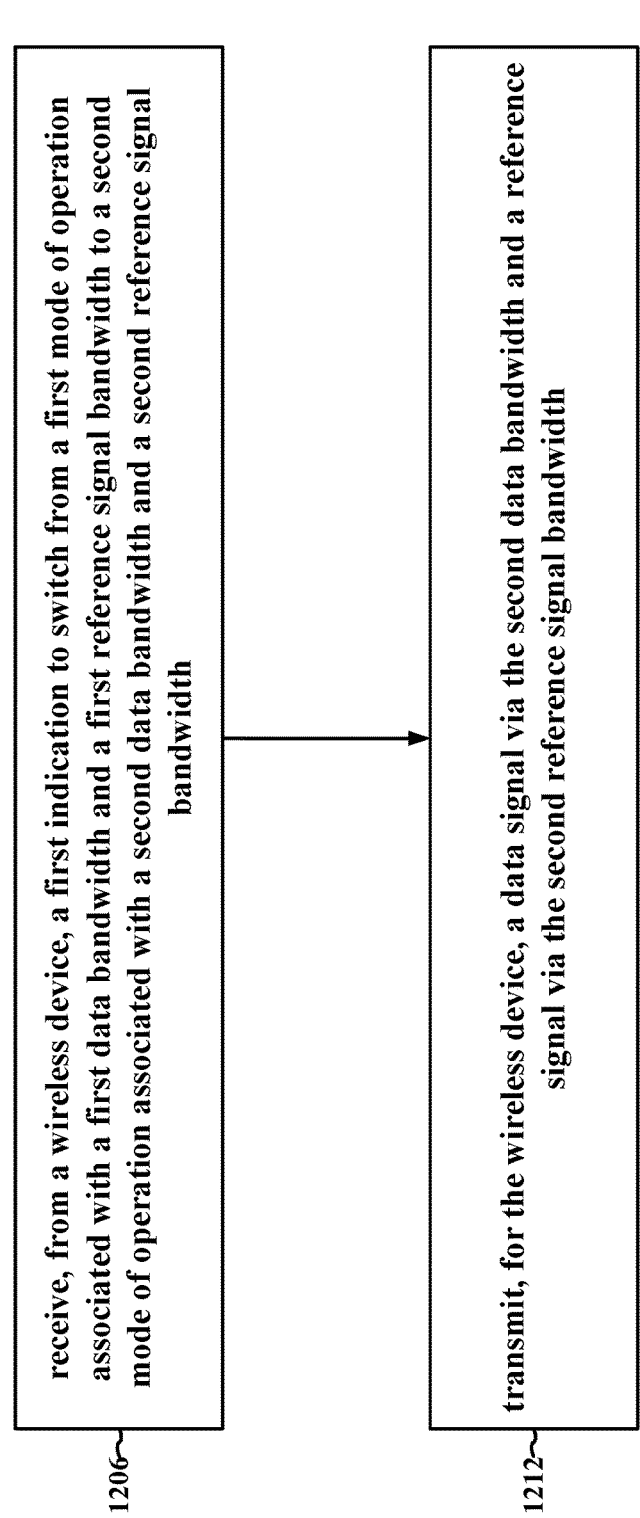

1200

1206 — receive, from a wireless device, a first indication to switch from a first mode of operation associated with a first data bandwidth and a first reference signal bandwidth to a second mode of operation associated with a second data bandwidth and a second reference signal bandwidth 1212 — transmit, for the wireless device, a data signal via the second data bandwidth and a reference signal via the second reference signal bandwidth

FIG. 12

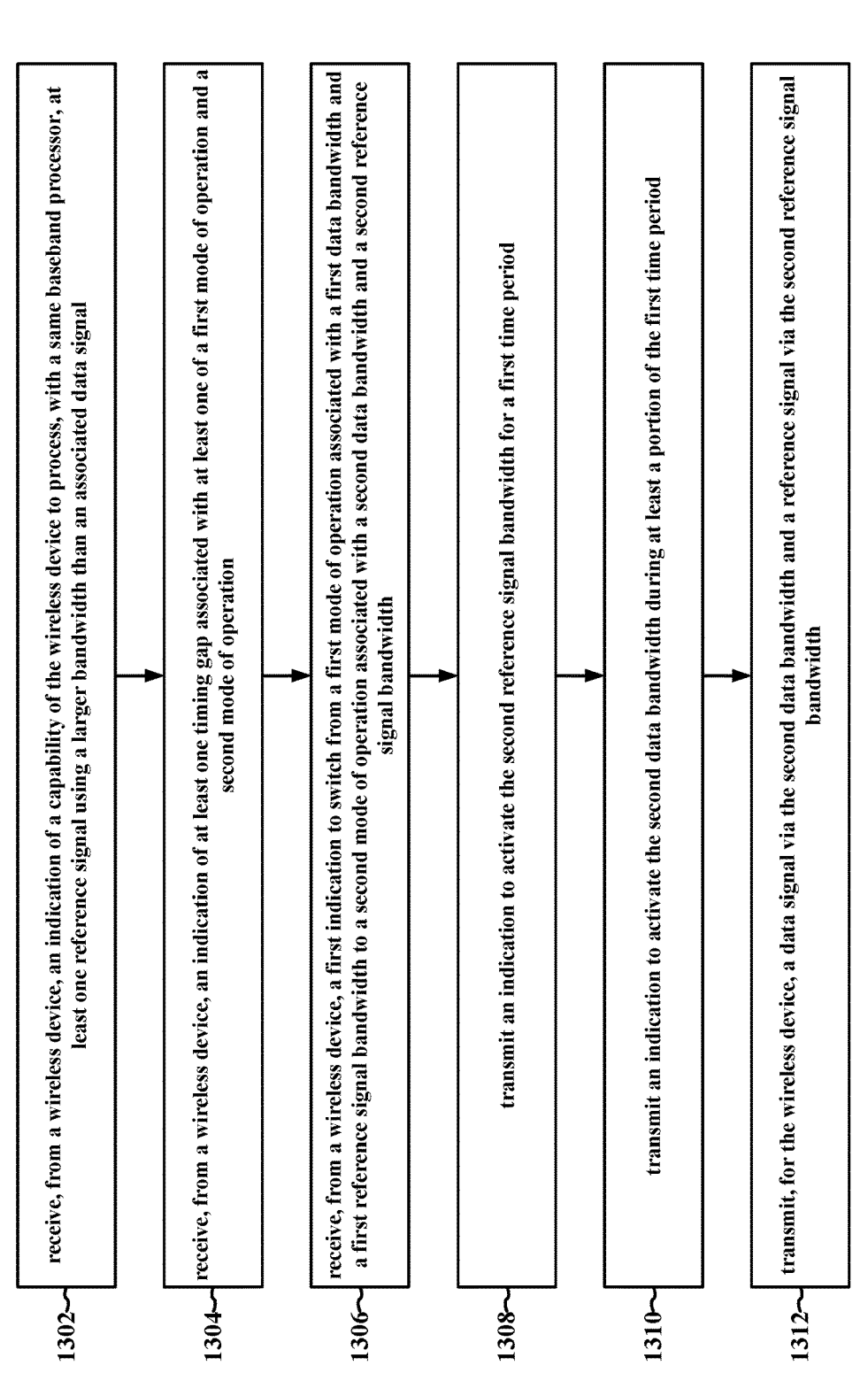

1302 — receive, from a wireless device, an indication of a capability of the wireless device to process, with a same baseband processor, at least one reference signal using a larger bandwidth than an associated data signal 1304 — receive, from a wireless device, an indication of at least one timing gap associated with at least one of a first mode of operation and a second mode of operation 1306 — receive, from a wireless device, a first indication to switch from a first mode of operation associated with a first data bandwidth and a first reference signal bandwidth to a second mode of operation associated with a second data bandwidth and a second reference signal bandwidth 1308 — transmit an indication to activate the second reference signal bandwidth for a first time period 1310 — transmit an indication to activate the second data bandwidth during at least a portion of the first time period 1312 — transmit, for the wireless device, a data signal via the second data bandwidth and a reference signal via the second reference signal bandwidth

WIDEBAND UE POWER SAVING BY SWITCHING WIDEBAND DATA TO NARROWBAND DATA WITH WIDEBAND REFERENCE SIGNAL

TECHNICAL FIELD

The present disclosure relates generally to communication systems, and more particularly, to a method of energy management for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a wireless device configured to detect a first trigger condition at the wireless device and transmit, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth.

In an aspect of the disclosure, a method, a computer-readable medium, and an apparatus are provided. The apparatus may be a network device configured to receive, from a wireless device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth. The apparatus may further be configured to transmit, for the wireless device, a data signal via the second data bandwidth and a reference signal via the second reference signal bandwidth.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

FIG. 12 is a flowchart of a method of wireless communication.

FIG. 13 is a flowchart of a method of wireless communication.

DETAILED DESCRIPTION

Figure 1:
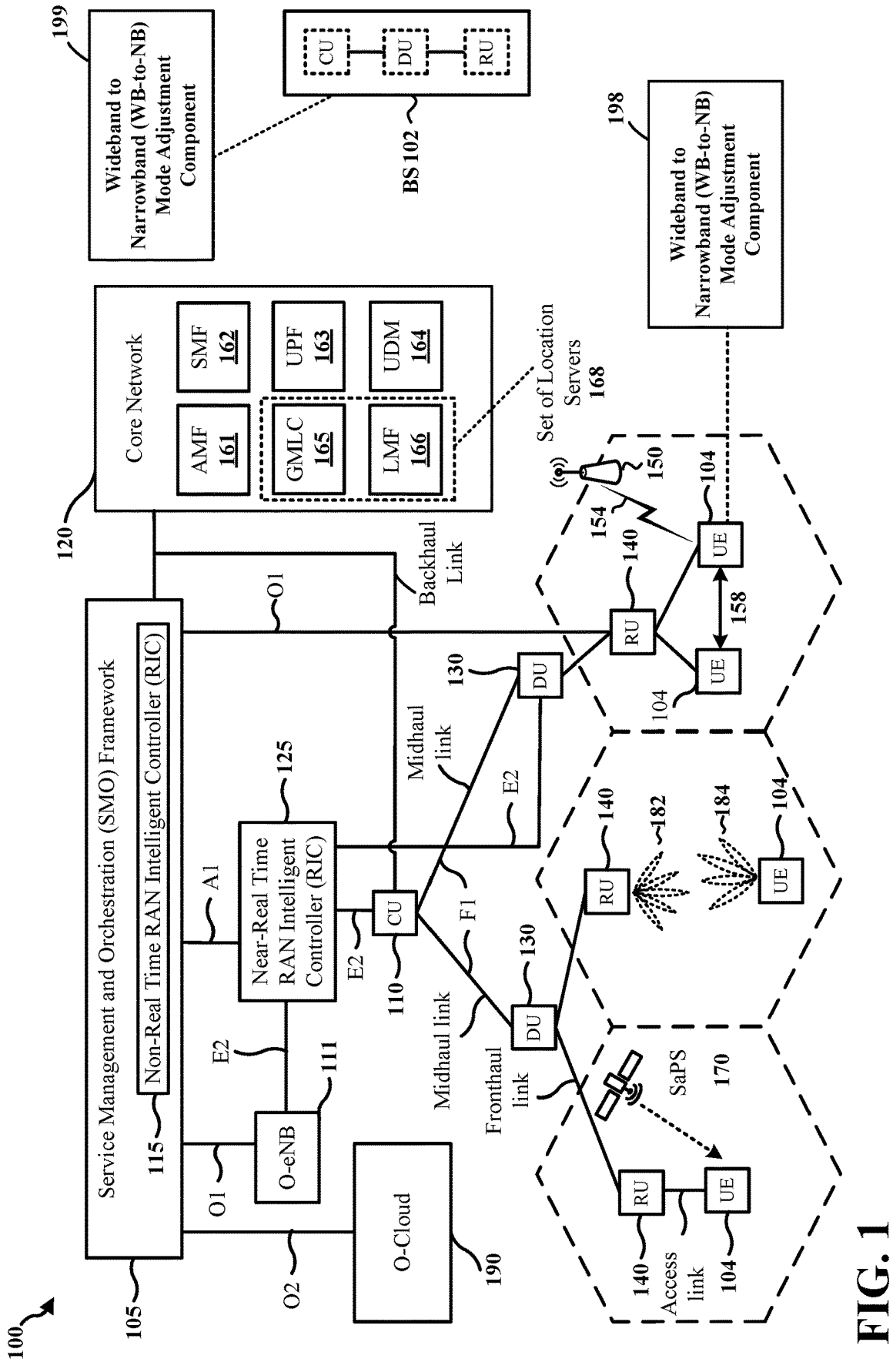
FIG. 1 is a diagram illustrating an example of a wireless communications system and an access network.

In some aspects of wireless communication, a network or wireless device may be capable of using an ultra-wide bandwidth for communication (e.g., a bandwidth of 400 MHz to 8 GHz in an ultra-wideband mode of operation). Channel estimation over the ultra-wide bandwidth may allow a network or wireless device to scan a larger bandwidth to identify a suitable or desired sub-band (e.g., a sub-band with a highest quality or received power) for a subsequent communication. However, in some aspects, a wireless device may not support (or may determine not to use) the ultra-wide bandwidth for one or more of channel estimation or data transfer. For a wireless device that does not support (or determines not to use) the ultra-wide bandwidth operation, an FMCW reference signal may be used to allow a channel estimation over the ultra-wide bandwidth using a mode of operation (or baseband processor) associated with a narrow(er) bandwidth (e.g., 20-400 MHz or larger for higher frequency ranges such as a 6 GHz or sub-THz frequency range).

The power (or energy) consumption associated with an ultra-wideband mode of operation may be larger, for example, due to a larger analog to digital conversion (ADC) sampling rate, a larger fast Fourier transform (FFT) size, or other factors. Based on the increased power consumption, a wireless device may determine to use a narrow-band mode of operation even when capable of using an ultra-wideband mode of operation. For example, a wireless device may determine to operate in a narrow-band mode of operation based on one or more of an amount of energy stored in a battery of the wireless device and/or an energy-consumption-to-harvesting ratio (ECHR).

Various aspects relate generally to power saving for a wideband-capable (or ultra-wideband-capable) wireless device. Some aspects more specifically relate to switching between normal (e.g., wideband) and power-saving (e.g., wideband reference signal and narrowband data) modes of operation for power saving in association with a configured grant or semi-persistent scheduling transmission while maintaining a wideband FMCW-based RS to identify a suitable or desired sub-band. In some examples, the method may include detecting a first trigger condition at the wireless device and transmitting, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth.

Particular aspects of the subject matter described in this disclosure can be implemented to realize one or more of the following potential advantages. In some examples, by enabling a switching between a wideband mode of data transmission and a narrowband mode of data transmission while maintaining a wideband mode for RS operation, the described techniques can be used to manage power consumption at a wideband-capable wireless device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other.

Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SaPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a wideband to narrowband (WB-to-NB) mode adjustment component 198 that may be configured to detect a first trigger condition at the wireless device and transmit, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth. In certain aspects, the base station 102 may have a WB-to-NB mode adjustment component 199 that may be configured to receive, from a wireless device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth. The WB-to-NB mode adjustment component 199 may further be configured to transmit, for the wireless device, a data signal via the second data bandwidth and a reference signal via the second reference signal bandwidth. Although the following description may be focused on 5G NR, the concepts described herein may be applicable to other similar areas, such as LTE, LTE-A, CDMA, GSM, and other wireless technologies.

Figures 2A, 2B, 2C, 2D:
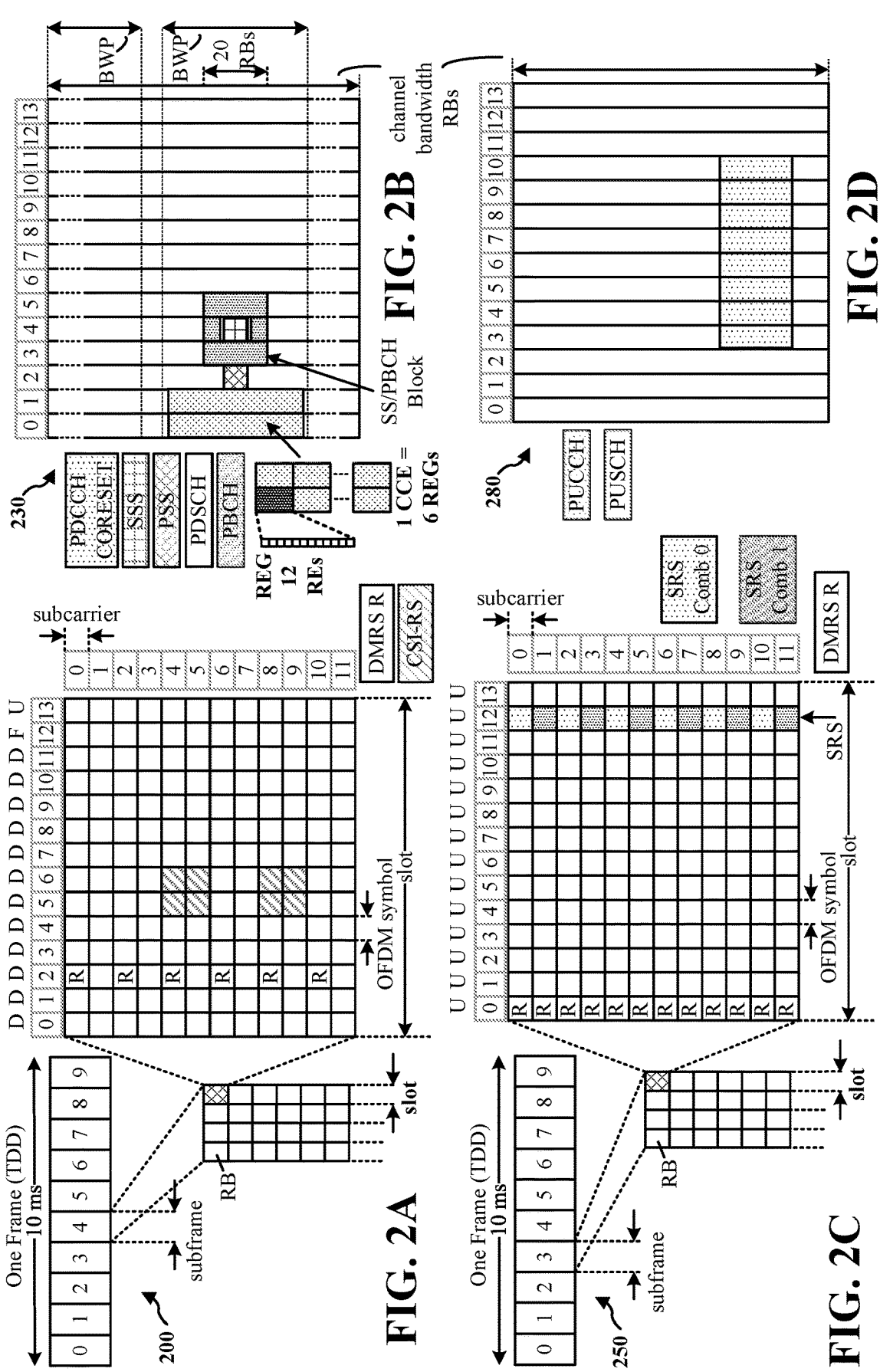
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15$[kHz] | Cyclic prefix |
| 0 | 15 | Normal |
| 1 | 30 | Normal |

TABLE 1-continued

| | Numerology, SCS, and CP | |
| --- | --- | --- |
| μ | SCS Δf = $2^\mu \cdot 15$[kHz] | Cyclic prefix |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to 24*15 kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
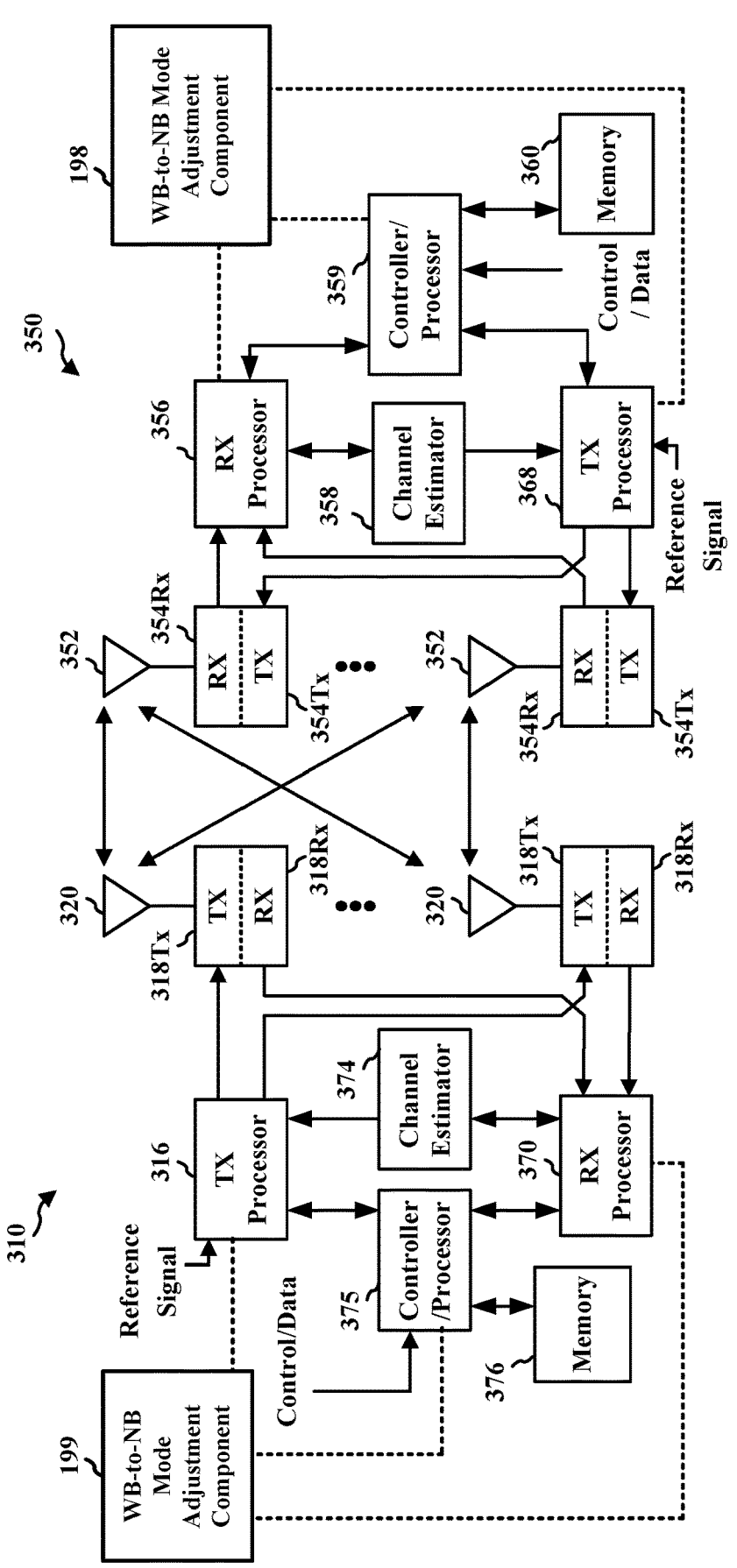
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antennas 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the WB-to-NB mode adjustment component 198 of FIG. 1.

At least one of the TX processor 316, the RX processor 370, and the controller/processor 375 may be configured to perform aspects in connection with the WB-to-NB mode adjustment component 199 of FIG. 1.

In some aspects of wireless communication, a network or wireless device may be capable of using an ultra-wide bandwidth for communication (e.g., a bandwidth of 400 MHz to 8 GHz in an ultra-wideband mode of operation). Channel estimation over the ultra-wide bandwidth may allow a network or wireless device to scan a larger bandwidth to identify a suitable or desired sub-band (e.g., a sub-band with a highest quality or received power) for a subsequent communication. However, in some aspects, a wireless device may not support (or may determine not to use) the ultra-wide bandwidth for one or more of channel estimation or data transfer. For a wireless device that does not support (or determines not to use) the ultra-wide bandwidth operation, a FMCW reference signal may be used to allow a channel estimation over the ultra-wide bandwidth using a mode of operation (or baseband processor) associated with a narrow(er) bandwidth (e.g., 20-400 MHz or larger for higher frequency ranges such as a 6 GHz or sub-THz frequency range).

The power (or energy) consumption associated with an ultra-wideband mode of operation may be larger, for example, due to a larger ADC sampling rate, a larger FFT size, or other factors. Based on the increased power consumption, a wireless device may determine to use a narrowband mode of operation even when capable of using an ultra-wideband mode of operation. For example, a wireless device may determine to operate in a narrow-band mode of operation based on one or more of an amount of energy stored in a battery of the wireless device and/or an ECHR (a ratio between an energy consumption associated with a planned or possible operation of the wireless device and an energy such as solar energy, heat energy, or RF radiation received or recovered at the wireless device based on an energy harvesting operation).

Various aspects relate generally to power saving for a wideband-capable (or ultra-wideband-capable) wireless device. Some aspects more specifically relate to switching between wideband and narrowband modes of operation for power saving in association with a configured grant or semi-persistent scheduling transmission while maintaining a wideband FMCW-based RS to identify a suitable or desired sub-band. In some examples, the method may include detecting a first trigger condition (e.g., a trigger condition related to an energy available at the wireless device) and transmitting, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth.

Figure 4:
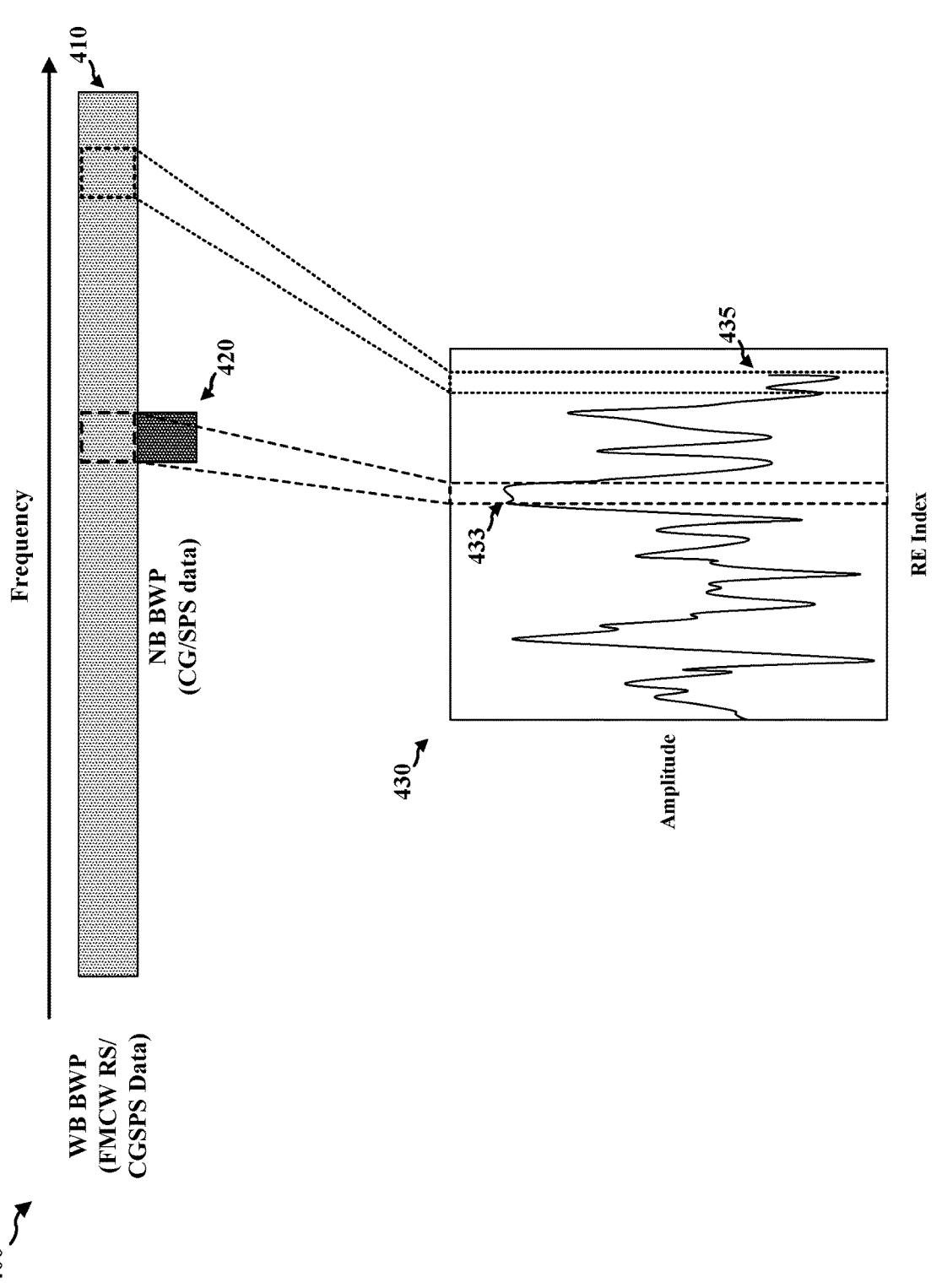
FIG. 4 is a diagram illustrating the use of a frequency modulated continuous wave (FMCW) reference signal (RS) over a wideband (WB) bandwidth part (BWP) to determine an optimized or suitable set of resource elements (REs) or a narrowband (NB) BWP for a related data transmission.

FIG. 4 is a diagram 400 illustrating the use of a FMCW RS over a wideband (or ultra-wideband) BWP 410 to determine an optimized or suitable set of REs or a narrowband BWP 420 for a related data transmission. In some aspects, the FMCW RS may be used to estimate the channel. For example, the FMCW RS may be used to generate the information regarding the amplitude of the signal as a function of REs in the WB BWP 410 represented in graph 430. The information may be used to determine one or more suitable or desired bandwidths (e.g., suitable or desired bandwidth 433) associated with a large amplitude or high channel quality (e.g., as measured by a reference signal received power (RSRP), reference signal received quality (RSRQ), or signal to noise ratio (SNR)) and/or an unsuitable or undesired bandwidth (e.g., unsuitable or undesired bandwidth 435) associated with a small amplitude or low channel quality. In some aspects, the use of the FMCW may allow a wireless device to process the WB RS using processing resources that are associated with a NB CG or SPS data transmission (e.g., a narrowband baseband processor).

Figure 5:
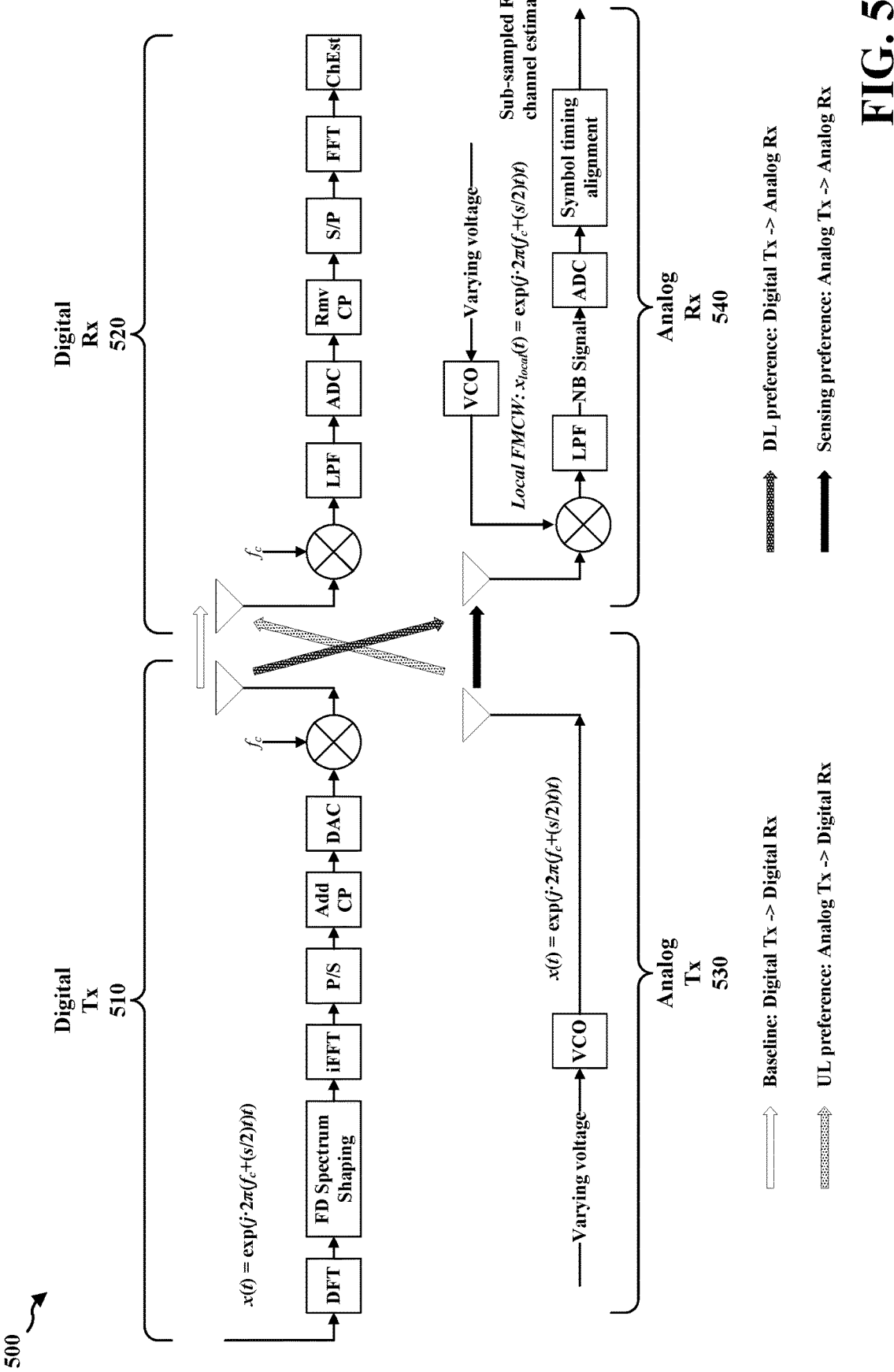
FIG. 5 is a diagram illustrating elements associated with a digital transmission architecture, a digital reception architecture, an analog transmission architecture, and an analog reception architecture in accordance with some aspects of the disclosure.

FIG. 5 is a diagram 500 illustrating elements associated with a digital transmission architecture 510, a digital reception architecture 520, an analog transmission architecture 530, and an analog reception architecture 540 in accordance with some aspects of the disclosure. The transmission of the FMCW RS may be via a digital transmission associated with the digital transmission architecture 510 or the analog transmission architecture 530. In some aspects, the wireless device may receive (and process) the FMCW RS via the digital reception architecture 520 when operating in a WB mode of operation (using a WB BWP for RS and/or data transmission). The wireless device, in some aspects, may receive (and process) the FMCW RS via the analog reception architecture 540. In some aspects, using the analog reception architecture 540 to receive and process the FMCW RS reduces the resources and/or power associated with the reception and processing when compared to using the digital reception architecture 520 (e.g., associated with a sampling rate that may be reduced by a factor of approximately 16).

Figure 6:
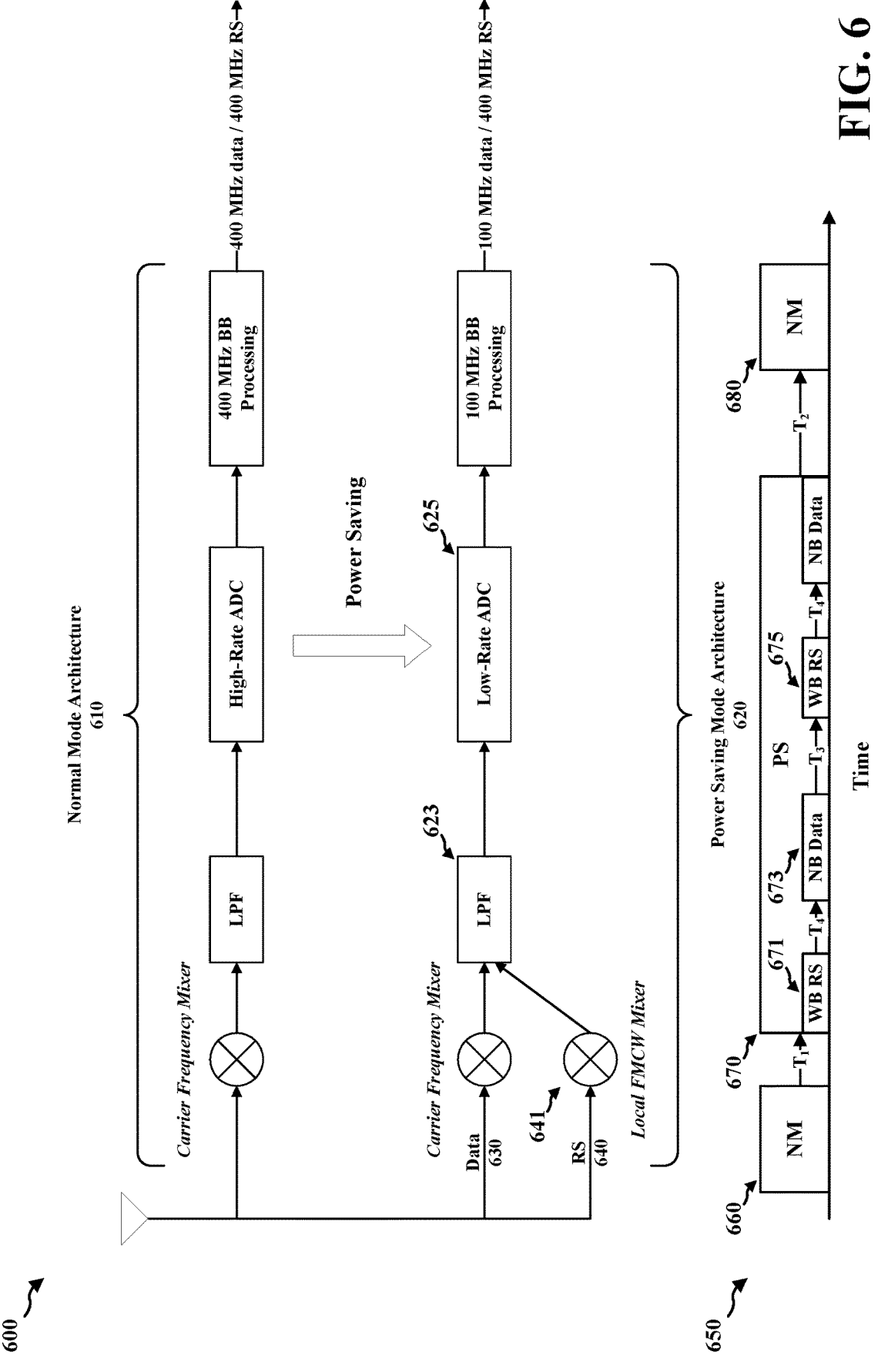
FIG. 6 is a set of diagrams including a first diagram illustrating a reception architecture associated with a wireless device capable of switching between a normal (or WB RS and WB DL data) mode of operation and a power saving (WB RS and NB DL data) mode of operation and a second diagram illustrating time gaps associated with switching between different modes of operation in accordance with some aspects of the disclosure.

FIG. 6 is a set of diagrams including diagram 600 illustrating a reception architecture associated with a wireless device capable of switching between a normal (or WB RS and WB DL data) mode of operation and a power saving (WB RS and NB DL data) mode of operation and a diagram 650 illustrating time gaps associated with switching between different modes of operation in accordance with some aspects of the disclosure. In some aspects, in a normal mode of operation (e.g., a mode of operation using a same BWP for transmissions associated with a RS, DL data, and UL data), the wireless device may use a normal mode reception architecture 610. The wireless device, in some aspects, may transition to using a power saving mode reception architecture 620 when operating in a power saving mode associated with the use of WB BWP for transmissions associated with an (FMCW) RS while using a NB BWP for transmissions associated with at least DL data (where UL data may use the WB BWP or the NB BWP even in the power saving mode of operation). The power saving mode reception architecture 620, in some aspects, may include a first sub-architecture (or processing pipeline) associated with processing data 630 and a second sub-architecture (or processing pipeline) associated with processing the RS 640. For example, by using a local FMCW mixer 641 as an input to a low pass filter (LPF) 623, and providing the output to a low-rate ADC 625, the wireless device may reduce a processing power associated with a channel estimation over the WB BWP (e.g., to be similar to the processing power associated with processing the data 630 based on using the same components at a same sampling rate).

Diagram 650 illustrates a set of time gaps associated with switching between different modes or data types within a mode. For example, a transition from a WB, or normal, mode of operation 660 to a power saving mode of operation 670 (or from a power saving mode of operation 670 to a WB, or normal, mode of operation 680) may be associated with a minimum time gap $T_1$ (or $T_2$, respectively). While operating in the power saving mode of operation 670, a transition from the reception of the WB FMCW RS 671 to the reception of the NB data 673 (or from NB data 673 to WB FMCW RS 675) may be associated with a minimum time gap the $T_4$ (or $T_3$, respectively).

Figure 7:
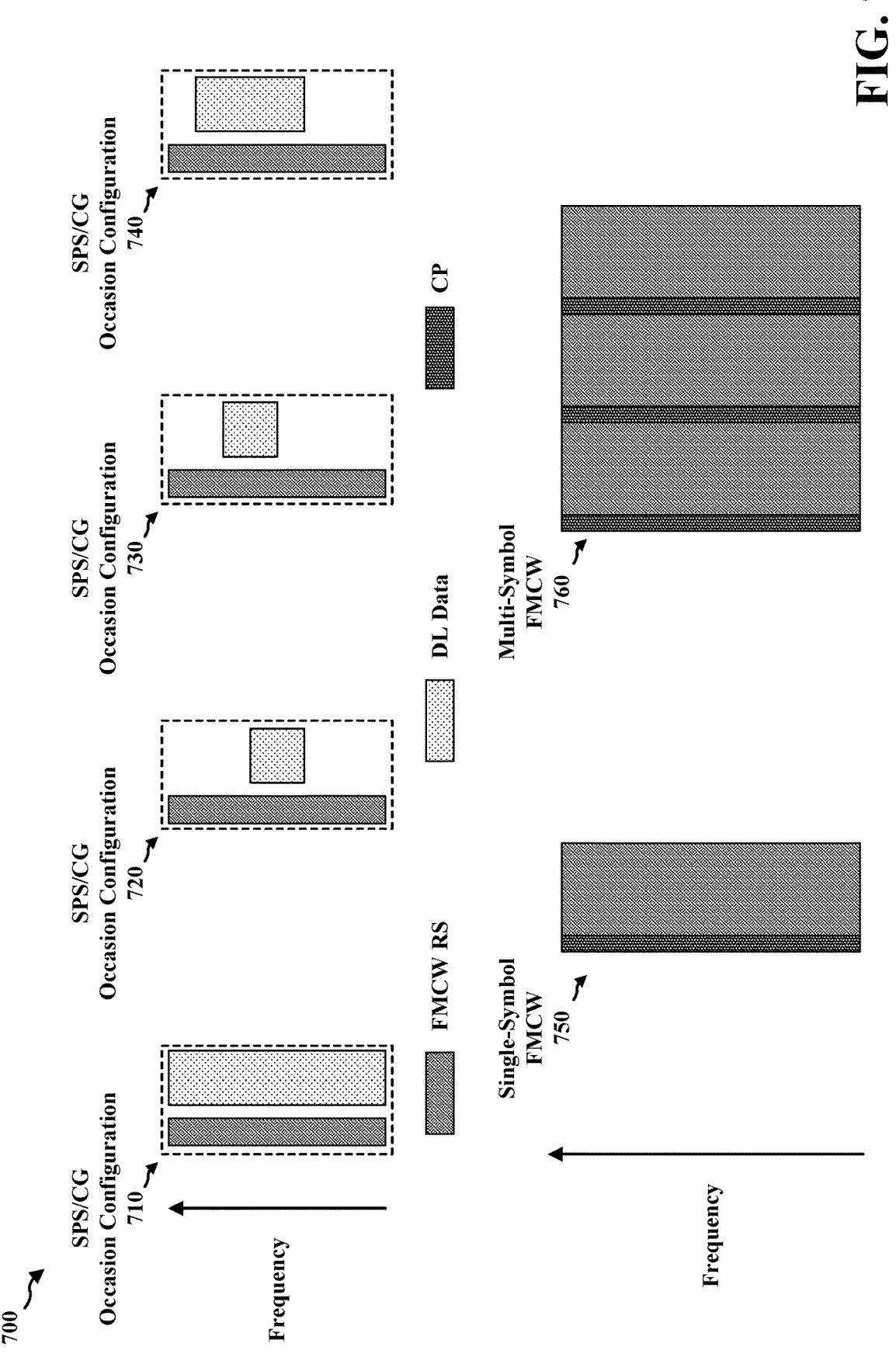
FIG. 7 is a diagram illustrating different configurations for RS and data transmissions associated with a semi-persistent scheduling (SPS) or configured grant (CG) occasion in accordance with some aspects of the disclosure.

FIG. 7 is a diagram 700 illustrating different configurations for RS and data transmissions associated with a SPS or CG occasion in accordance with some aspects of the disclosure. In some aspects, a WB, or normal, mode of operation may be associated with a first SPS and/or CG occasion configuration 710 associated with a first reference signal bandwidth (e.g., a WB RS bandwidth, or BWP, associated with an FMCW RS) and a first data bandwidth (e.g., a WB data bandwidth, or BWP, associated with a data transmission that is the same as, or with a size similar to the BWP associated with the WB RS). A power saving mode may be associated with one of a second SPS and/or CG occasion configuration 720, a third SPS and/or CG occasion configuration 730, and/or a fourth SPS and/or CG occasion configuration 740. A bandwidth, or BWP, associated with an RS (e.g., an FMCW RS) during one of the SPS and/or CG occasions using one of the SPS and/or CG configurations 720-740 may be the same as the bandwidth, or BWP, associated with the RS during an SPS and/or CG occasion using the SPS and/or CG occasion configuration 710. However, a bandwidth, or BWP, associated with a data transmission during one of the SPS and/or CG occasions using one of the SPS and/or CG configurations 720-740 may be smaller than the bandwidth, or BWP, associated with the RS during an SPS and/or CG occasion using the SPS and/or CG occasion configuration 710. In some aspects, the FMCW RS using the WB BWP may be a single-symbol FMCW 750 or a multi-symbol FMCW RS 760. In some aspects, the CP for the multi-symbol FMCW RS 760 may involve frequency hopping.

Figure 8:
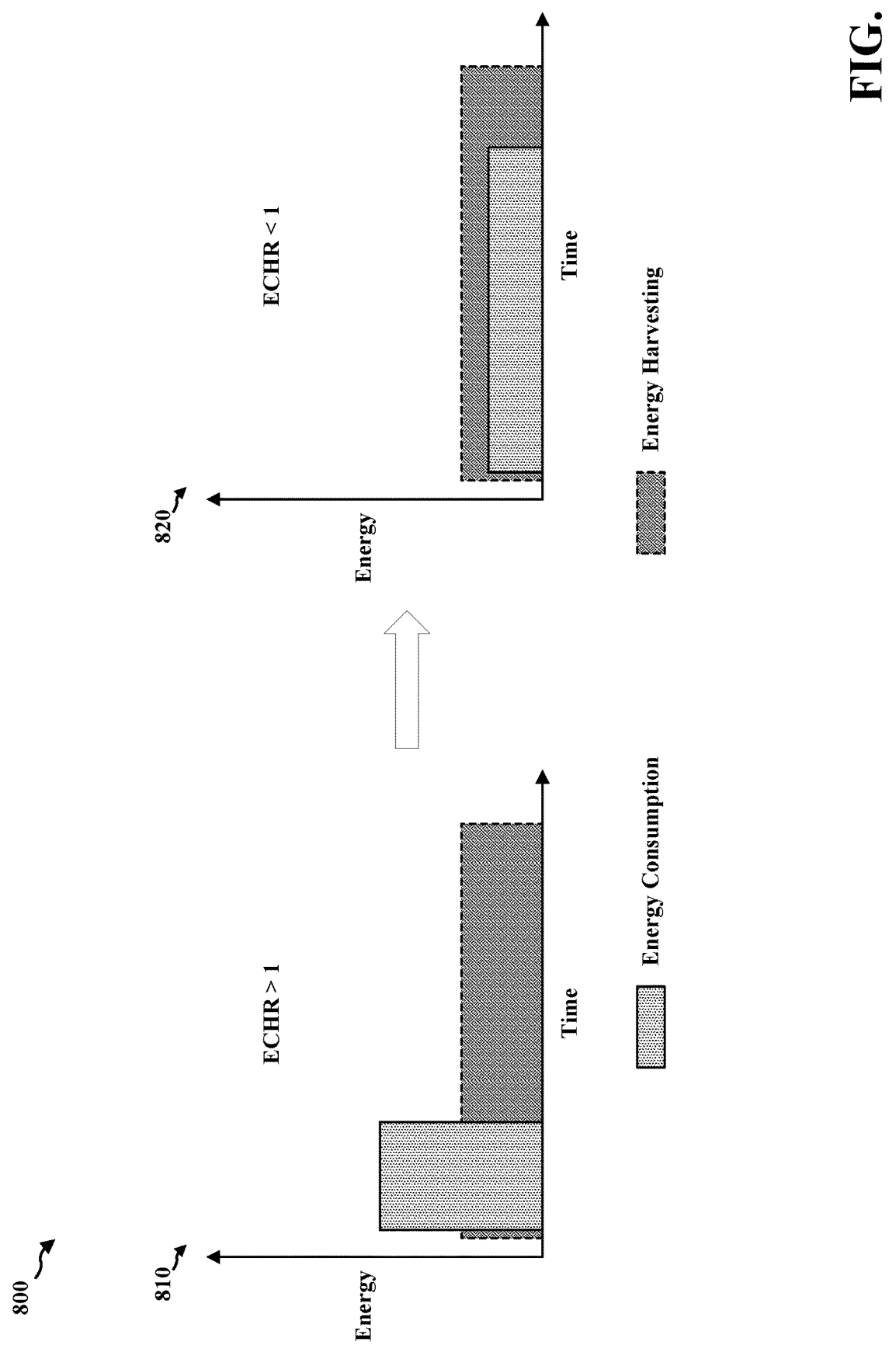
FIG. 8 is a diagram illustrating an energy consumption and energy harvesting that may be associated with the normal mode of operation and the power saving mode of operation in accordance with some aspects of the disclosure.

FIG. 8 is a diagram 800 illustrating an energy consumption and energy harvesting that may be associated with the normal mode of operation and the power saving mode of operation in accordance with some aspects of the disclosure. For example, for a first transmission associated with a first total consumed power, a first graph 810 illustrates that in a first normal mode of operation, a rate of energy consumption during a first time period may exceed a rate of energy harvesting that may lead to a wireless device running out of energy (or not having sufficient energy) to complete the first transmission. A second graph 820 illustrates that in a power saving mode of operation (being associated with a lower rate of energy consumption) the rate of energy harvesting may exceed the rate of energy consumption such that the wireless device is not likely to run out of energy (or to not have sufficient energy) for a same total energy consumption (or total consumed power).

In some aspects, the ratio between an expected energy consumption rate in a first, normal or WB, mode of operation and an energy harvesting rate (an ECHR) may be used to trigger a transition to a second, power saving or NB mode of operation. In some aspects, one or more ECHR thresholds may be associated with one or more stored energy thresholds. For example, if a stored energy (e.g., associated with a battery power) at the wireless device is below a first threshold (e.g., 10% or 20%), the ECHR threshold for triggering a power saving mode may be 1 (e.g., an expected ECHR value greater than 1 may trigger a transition to a power saving mode), while for a stored energy above the first threshold (and below a next threshold) the ECHR threshold may be set to a second value (an expected ECHR value above 1.25 may trigger the transition to the power saving mode). In some aspects, instead of pre-determined threshold values, the ECHR threshold may be a function of the stored energy, the energy harvesting rate, and a desired time for the wireless to function (or a desired time before the wireless runs out of energy). For example, to operate for 1 hour with a stored energy sufficient for 30 minutes, the ECHR should be no greater than 2 (and may be determined based on a margin of error or safety factor to account for deviations from the expected energy consumption and/or energy harvesting). For indefinite operation, the ECHR may be set to no greater than 1 (or less than 1 to allow for a margin of error). In some aspects, a stored energy (e.g., a battery life) threshold may be associated with triggering a transition to a power saving mode independent of an ECHR or other energy consumption or energy harvesting characteristics.

Figure 9:
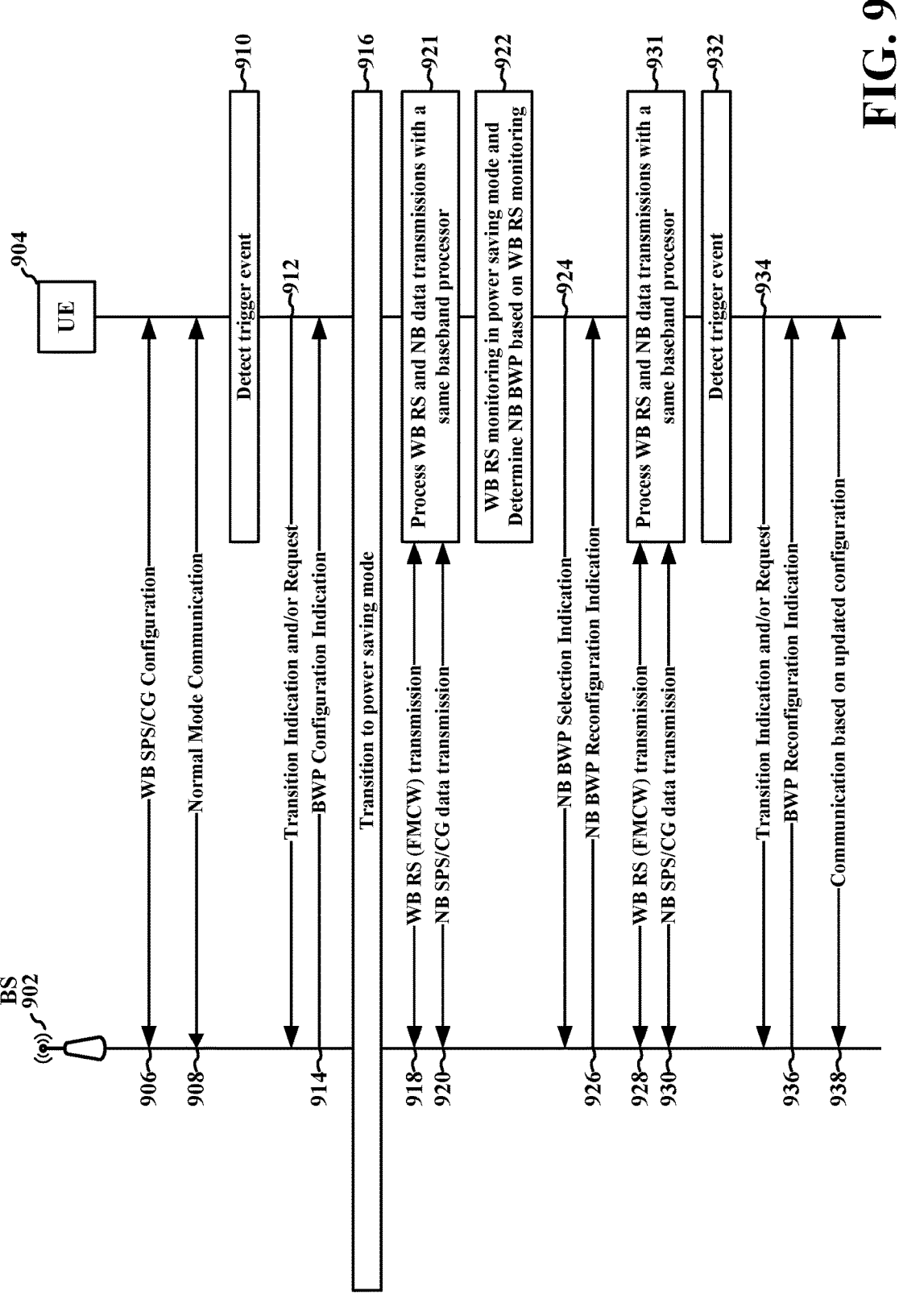
FIG. 9 is a call flow diagram illustrating a method of power saving at a UE in communication with a base station in accordance with some aspects of the disclosure.

FIG. 9 is a call flow diagram 900 illustrating a method of power saving at a UE 904 (e.g., as an example of a wireless device) in communication with a base station 902 (e.g., as an example of a network device or network node that may include one or more components of a disaggregated base station) in accordance with some aspects of the disclosure. The functions ascribed to the base station 902, in some aspects, may be performed by one or more components of a network entity, a network node, or a network device (a single network entity/node/device or a disaggregated network entity/node/device as described above in relation to FIG. 1). Similarly, the functions ascribed to the UE 904, in some aspects, may be performed by one or more components of a wireless device supporting communication with a network entity/node/device. Accordingly, references to "transmitting" in the description below may be understood to refer to a first component of the base station 902 (or the UE 904) outputting (or providing) an indication of the content of the transmission to be transmitted by a different component of the base station 902 (or the UE 904). Similarly, references to "receiving" in the description below may be understood to refer to a first component of the base station 902 (or the UE 904) receiving a transmitted signal and outputting (or providing) the received signal (or information based on the received signal) to a different component of the base station 902 (or the UE 904).

The base station 902, in some aspects, may exchange a set of WB SPS/CG configuration messages 906 with the UE 904. The set of WB SPS/CG configuration messages 906, in some aspects, may be associated with a communication between the base station 902 and the UE 904. In some aspects, the UE 904 may, as part of configuring the communication transmit an indication of a capability to use the power saving mode of operation associated with the WB FMCW RS and the NB data transmission. The indication of the capability, in some aspects, may include an indication of a set of minimum time gaps (e.g., $T_1$, $T_2$, $T_3$, and/or $T_4$ of FIG. 6) for transitions between modes of operations and/or types of transmissions as described in relation to FIG. 6. As described in relation to FIG. 7, the WB SPS/CG configuration messages 906, in some aspects, may include a RS BWP and a data BWP of a similar, or equal, size and/or location in a frequency domain. Based on the WB SPS/CG configuration messages 906, the UE 904 and the base station 902 may exchange normal mode communication 908 including a WB RS (e.g., an FMCW RS or non-FMCW RS) and one or more WB data transmissions (DL and/or UL transmissions).

At 910, the UE 904 may detect a triggering event. As explained in relation to FIG. 8, the triggering event may be based on one or more thresholds associated with an ECHR and/or stored energy. For example, at 910, the UE 904 may detect an ECHR above 1 and/or a stored energy below a first threshold (e.g., associated with 30 minutes, or some other configured duration, of operation). Based on detecting the triggering event at 910, the UE may determine to indicate to the base station 902 to begin transmissions using a power saving mode of operation.

The UE 904, based on detecting the triggering event at 910, may transmit, and the base station 902 may receive, a transition indication and/or request 912 indicating for the base station 902 to transmit an updated SPS and/or CG occasion configuration and/or indication associated with the power saving mode of operation and/or to transition to the power saving mode of operation. In some aspects, the transition indication and/or request 912 may include an indication of a suitable or desired NB BWP (e.g., an indication of one or more sets of REs within the WB BWP associated with the normal mode of operation with a channel quality that meet a threshold quality value as measured by an RSRP, RSRQ, or SNR). Based on the transition indication and/or request 912, the base station may determine a configuration for one or more BWPs (e.g., at least one WB BWP for channel measurement and at least one BWP for a NB data transmission) associated with the power saving mode of operation. Based on the determined configuration for the one or more BWPs, the base station 902 may transmit, and the UE 904 may receive, a BWP configuration indication 914. The BWP configuration indication 914, in some aspects, may include an indication of a duration for implementing the BWP configuration indication 914 and/or a time at which to implement the BWP configuration indication 914. The BWP configuration indication 914, in some aspects, may include an indication of a wideband reference signal bandwidth and a narrowband data bandwidth. In some aspects, the BWP configuration indication 914 may include an indication to activate the wideband reference signal bandwidth for a first time period and/or an indication to activate the narrowband data bandwidth during at least a portion of the first time period. The narrowband data bandwidth in some aspects, may be used for DL data transmissions or for both DL and UL data transmissions.

At 916, the base station 902 and the UE 904 may transition to the power saving mode of operation. In association with the power saving mode, the base station 902 may transmit, and the UE 904 may receive, at least one WB FMCW RS transmission 918 and a NB SPS/CG data transmission 920 associated with one or more SPS/CG occasions as described in relation to FIG. 7 (e.g., with one of the SPS and/or CG configurations 720-740). In some aspects, the UE 904 may, at 921, process the WB FMCW RS transmission 918 and the NB SPS/CG data transmission 920 using a same baseband processor as described in relation to FIG. 6 using the power saving mode reception architecture 620.

The UE 904, in some aspects, may, at 922, monitor the WB channel based on the WB FMCW RS transmission 918 and determine an updated suitable or desired NB BWP for data transmission. The UE 904, based on determining an updated suitable or desired NB BWP for data transmission at 922, may transmit, and the base station 902 may receive, a NB BWP selection indication 924 indicating for the base station 902 to transmit an updated SPS and/or CG occasion configuration and/or indication associated with the power saving mode of operation. In some aspects, the NB BWP selection indication 924 may include an indication of an updated suitable or desired NB BWP (e.g., an updated indication of one or more sets of REs within the WB BWP associated with the WB FMCW RS with a channel quality that meet a threshold quality value as measured by an RSRP, RSRQ, or SNR). For example, referring to FIG. 7, the NB BWP selection indication 924 may indicate a transition between any of the second SPS and/or CG occasion configuration 720, the third SPS and/or CG occasion configuration 730, and/or the fourth SPS and/or CG occasion configuration 740. Based on the NB BWP selection indication 924, the base station may determine an updated configuration for one or more BWPs (e.g., at least one WB BWP for channel measurement and at least one BWP for a NB data transmission) associated with the power saving mode of operation. Based on the determined configuration for the one or more BWPs, the base station 902 may transmit, and the UE 904 may receive, a NB BWP reconfiguration indication 926. The NB BWP reconfiguration indication 926, in some aspects, may include an indication of a duration for implementing the NB BWP reconfiguration indication 926 and/or a time at which to implement the NB BWP reconfiguration indication 926. The NB BWP reconfiguration indication 926, in some aspects, may include an indication of an updated wideband reference signal bandwidth and an updated narrowband data bandwidth. In some aspects, the NB BWP reconfiguration indication 926 may include an indication to activate the updated wideband reference signal bandwidth for a first time period and/or an indication to activate the updated narrowband data bandwidth during at least a portion of the first time period.

In association with the power saving mode and the NB BWP reconfiguration indication 926, the base station 902 may transmit, and the UE 904 may receive, at least one WB FMCW RS transmission 928 and a NB SPS/CG data transmission 930 associated with one or more SPS/CG occasions as described in relation to FIG. 7 (e.g., with one of the SPS and/or CG configurations 720-740).

At 932, the UE 904 may detect an additional triggering event. As explained in relation to FIG. 8, the triggering event may be based on one or more thresholds associated with an ECHR and/or stored energy. For example, at 932, the UE 904 may detect an ECHR below 1 and/or a stored energy above a first threshold (e.g., associated with 30 minutes, or some other configured duration, of operation). Based on detecting the triggering event at 932, the UE may determine that the power saving mode is no longer suitable or desired and may indicate to the base station 902 to begin transmissions using a normal mode of operation. Alternatively, the additional triggering event may be associated with a different threshold value of the ECHR and or stored energy that indicates for a smaller BWP associated with the NB data BWP. Based on the additional triggering event detected at 932, the UE 904 may transmit, and the base station 902 may receive, transition indication and/or request 934 to transition to a normal mode of operation and/or a power saving mode of operation with a smaller (or larger) BWP for data transmissions. For example, referring to FIG. 7, the transition indication and/or request 934 may indicate a transition between a current SPS and/or CG occasion configuration (e.g., any of the SPS and/or CG occasion configurations 720-740) to a different SPS and/or CG occasion configuration (e.g., another of the SPS and/or CG configurations 710-740).

The base station 902, based on the transition indication and/or request 934, may transmit, and the UE 904 may receive, BWP reconfiguration indication 936. BWP reconfiguration indication 936 may include an indication of a WB RS and WB data BWP associated with a normal mode of operation or an updated NB data BWP (and, in some aspects, an updated WB FMCW RS BWP). The BWP reconfiguration indication 936, in some aspects, may include an indication of a duration for implementing the BWP reconfiguration indication 936 and/or a time at which to implement the BWP reconfiguration indication 936. The BWP reconfiguration indication 936, in some aspects, may include an indication of an updated wideband reference signal bandwidth and an updated narrowband data bandwidth. In some aspects, the BWP reconfiguration indication 936 may include an indication to activate the updated wideband reference signal bandwidth for a first time period and/or an indication to activate the updated narrowband data bandwidth during at least a portion of the first time period. Based on the BWP reconfiguration indication 936, the base station 902 and the UE 904 may exchange communication 938.

Figure 10:
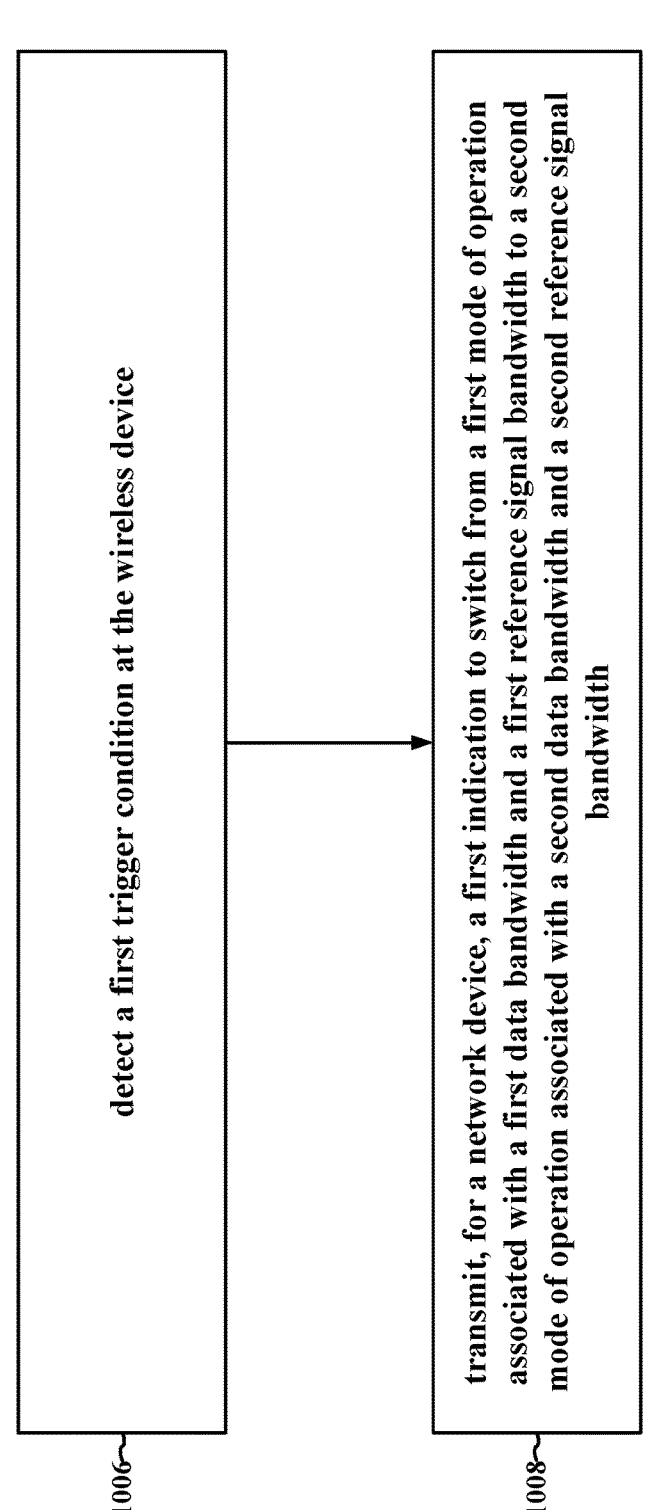
FIG. 10 is a flowchart of a method of wireless communication.

FIG. 10 is a flowchart 1000 of a method of wireless communication. The method may be performed by a UE (e.g., the UE 104; the apparatus 1404). In some aspects, the UE may transmit an indication of a capability to process, with a same baseband processor, at least one reference signal using a larger bandwidth than an associated data signal. For example, 1002 may be performed by application processor(s) 1406, cellular baseband processor(s) 1424, transceiver(s) 1422, antenna(s) 1480, and/or WB-to-NB mode adjustment component 198 of FIG. 14. In some aspects, the at least one reference signal may be a FMCW reference signal. Referring to FIG. 9, for example, the UE 904 may, as part of configuring resources for a communication, transmit an indication of a capability to use the power saving mode of operation associated with the WB FMCW RS and the NB data transmission within the set of WB SPS/CG configuration messages 906.

In some aspects, the UE may transmit an indication of at least one timing gap associated with at least one of a first mode of operation and a second mode of operation. In some aspects, the UE may transmit at least one of a second indication of a first minimum timing gap associated with a switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission (where a third data bandwidth associated with the data transmission is smaller than a third reference signal bandwidth associated with the reference signal transmission), or a fifth indication of a fourth minimum timing gap associated with a switch from the reference signal transmission to the data transmission (where the third data bandwidth associated with the data transmission is smaller than the third reference signal bandwidth associated with the reference signal transmission). For example, referring to FIGS. 6 and 9, the UE 904 may transmit within the set of WB SPS/CG configuration messages 906 an indication of one or more of the set of minimum time gaps (e.g., $T_1$, $T_2$, $T_3$, and/or $T_4$ of FIG. 6).

At 1006, the UE may detect a first trigger condition at the UE. In some aspects, the first trigger condition may be related to the energy available at the UE. For example, 1006 may be performed by application processor(s) 1406, cellular baseband processor(s) 1424, transceiver(s) 1422, antenna(s) 1480, and/or WB-to-NB mode adjustment component 198 of FIG. 14. In some aspects, the first trigger condition may be associated with a battery power available at the UE being below a threshold amount of power. The first trigger condition, in some aspects, may be associated with an ECHR at the UE. In some aspects, the first trigger condition may be associated with both the battery power available at the UE and the ECHR at the UE. For example, referring to FIGS. 8 and 9, the UE 904 may detect at 910 (or 932) a triggering event that may be based on one or more thresholds associated with an ECHR and/or stored energy as described in relation to FIG. 8.

At 1008, the UE may, based on detecting the first trigger condition at the UE at 1006, transmit, for a network device, an indication to switch from a first mode of operation associated with a first data bandwidth and a first reference signal bandwidth to a second mode of operation associated with a second data bandwidth and a second reference signal bandwidth. For example, 1008 may be performed by application processor(s) 1406, cellular baseband processor(s)

Figure 14:
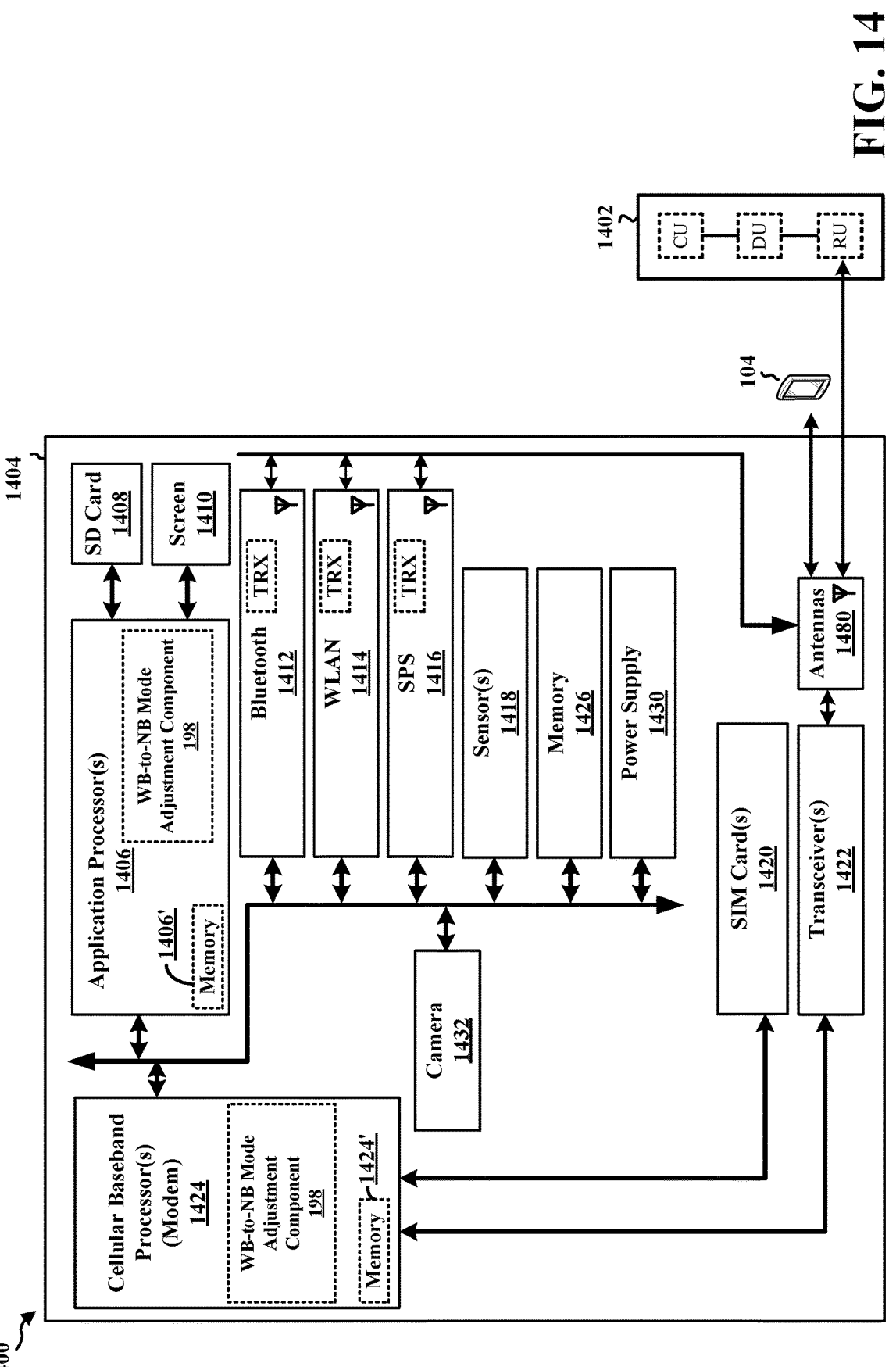
FIG. 14 is a diagram illustrating an example of a hardware implementation for an example apparatus and/or network entity.

1424, transceiver(s) 1422, antenna(s) 1480, and/or WB-to-NB mode adjustment component 198 of FIG. 14. In some aspects, at least one of the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; and the first data bandwidth is smaller than the second data bandwidth and the first reference signal bandwidth is larger than the first data bandwidth. In some aspects, if the second data bandwidth is smaller than the second reference signal bandwidth, the indication transmitted at 1008 may include an indication of the second data bandwidth in a set of one or more suitable or desired narrowband bandwidths. For example, referring to FIG. 9, the UE 904 may transmit transition indication and/or request 912 or 934 indicating for the base station 902 to transmit an updated SPS and/or CG occasion configuration associated with the power saving mode of operation and/or to transition to (or from) the power saving mode of operation.

In some aspects, the UE may receive an indication to activate the second reference signal bandwidth for a first time period. The UE, in some aspects, may receive an indication to activate the second data bandwidth during at least a portion of the first time period. In some aspects, the indications may be received based on the indication transmitted at 1008 to switch from the first mode of operation to the second mode of operation. For example, referring to FIG. 9, the UE 904 may receive the BWP configuration indication 914, the NB BWP reconfiguration indication 926, or the BWP reconfiguration indication 936 indicating a reference signal bandwidth and a data bandwidth (such as one of the RS bandwidth and data bandwidth associated with one of the SPS and/or CG occasion configuration 710, 720, 730, or 740) and a time to transition to a different mode of operation.

Based on the indication transmitted at 1008, the UE may transition to the second mode of operation and receive a data signal via the second data bandwidth and a reference signal via the second reference signal bandwidth. In some aspects, the reference signal may be a FMCW reference signal. In some aspects, the second reference signal bandwidth may be larger than the second data bandwidth, and the data signal may be associated with one or more periodic resource sets. Each of the one or more periodic resource sets, in some aspects, may include a first plurality of symbols, and the reference signal may be associated with one symbol in each of the one or more periodic resource sets or a second plurality of symbols in each of the one or more periodic resource sets.

In some aspects, the UE may process the data signal and the reference signal via a single baseband processor. The single baseband processor, in some aspects, may be a first baseband processor capable of processing a wideband data signal (e.g., if the second mode of operation is a normal mode of operation) or a second baseband processor that may be capable of processing a narrowband signal and a wideband FMCW reference signal (e.g., based on converting the wideband FMCW reference signal to a narrowband signal via a component such as local FMCW mixer 641 of FIG. 6) but not capable of processing a wideband data signal (e.g., a wideband data signal that is not susceptible to conversion to a narrowband data signal without data loss). For example, referring to FIGS. 6 and 9, the UE 904 may process, at 921 or 931, the WB FMCW RS transmission 918 and the NB SPS/CG data transmission 920, the WB FMCW RS transmission 928 and the NB SPS/CG data transmission 930, or the communication 938 using a same baseband processor such as the power saving mode reception architecture 620.

FIG. 11 is a flowchart 1100 of a method of wireless communication. The method may be performed by a UE (e.g., the UE 104; the apparatus 1404). At 1102, the UE may transmit an indication of a capability to process, with a same baseband processor, at least one reference signal using a larger bandwidth than an associated data signal. For example, 1102 may be performed by application processor(s) 1406, cellular baseband processor(s) 1424, transceiver(s) 1422, antenna(s) 1480, and/or WB-to-NB mode adjustment component 198 of FIG. 14. In some aspects, the at least one reference signal may be a FMCW reference signal. Referring to FIG. 9, for example, the UE 904 may, as part of configuring resources for a communication, transmit an indication of a capability to use the power saving mode of operation associated with the WB FMCW RS and the NB data transmission within the set of WB SPS/CG configuration messages 906.

At 1104, the UE may transmit an indication of at least one timing gap associated with at least one of a first mode of operation and a second mode of operation. For example, 1104 may be performed by application processor(s) 1406, cellular baseband processor(s) 1424, transceiver(s) 1422, antenna(s) 1480, and/or WB-to-NB mode adjustment component 198 of FIG. 14. In some aspects, the UE may transmit at least one of a second indication of a first minimum timing gap associated with a switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission (where a third data bandwidth associated with the data transmission is smaller than a third reference signal bandwidth associated with the reference signal transmission), or a fifth indication of a fourth minimum timing gap associated with a switch from the reference signal transmission to the data transmission (where the third data bandwidth associated with the data transmission is smaller than the third reference signal bandwidth associated with the reference signal transmission). For example, referring to FIGS. 6 and 9, the UE 904 may transmit within the set of WB SPS/CG configuration messages 906 an indication of one or more of the set of minimum time gaps (e.g., $T_1$, $T_2$, $T_3$, and/or $T_4$ of FIG. 6).

At 1106, the UE may detect a first trigger condition at the UE. In some aspects, the first trigger condition may be related to the energy available at the UE. For example, 1106 may be performed by application processor(s) 1406, cellular baseband processor(s) 1424, transceiver(s) 1422, antenna(s) 1480, and/or WB-to-NB mode adjustment component 198 of FIG. 14. In some aspects, the first trigger condition may be associated with a battery power available at the UE being below a threshold amount of power. The first trigger condition, in some aspects, may be associated with an ECHR at the UE. In some aspects, the first trigger condition may be associated with both the battery power available at the UE and the ECHR at the UE. For example, referring to FIGS. 8 and 9, the UE 904 may detect at 910 (or 932) a triggering event that may be based on one or more thresholds associated with an ECHR and/or stored energy as described in relation to FIG. 8.

At 1108, the UE may, based on detecting the first trigger condition at the UE at 1106, transmit, for a network device, an indication to switch from a first mode of operation associated with a first data bandwidth and a first reference signal bandwidth to a second mode of operation associated with a second data bandwidth and a second reference signal bandwidth. For example, 1108 may be performed by application processor(s) 1406, cellular baseband processor(s) 1424, transceiver(s) 1422, antenna(s) 1480, and/or WB-to-NB mode adjustment component 198 of FIG. 14. In some aspects, at least one of the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; and the first data bandwidth is smaller than the second data bandwidth and the first reference signal bandwidth is larger than the first data bandwidth. In some aspects, if the second data bandwidth is smaller than the second reference signal bandwidth, the indication transmitted at 1108 may include an indication of the second data bandwidth in a set of one or more suitable or desired narrowband bandwidths. For example, referring to FIG. 9, the UE 904 may transmit transition indication and/or request 912 or 934 indicating for the base station 902 to transmit an updated SPS and/or CG occasion configuration associated with the power saving mode of operation and/or to transition to (or from) the power saving mode of operation.

At 1110, the UE may receive an indication to activate the second reference signal bandwidth for a first time period. At 1112, the UE may receive an indication to activate the second data bandwidth during at least a portion of the first time period. For example, 1110 and 1112 may be performed by application processor(s) 1406, cellular baseband processor(s) 1424, transceiver(s) 1422, antenna(s) 1480, and/or WB-to-NB mode adjustment component 198 of FIG. 14. In some aspects, the indications received at 1110 and/or at 1112 may be received based on the indication transmitted at 1108 to switch from the first mode of operation to the second mode of operation. For example, referring to FIG. 9, the UE 904 may receive the BWP configuration indication 914, the NB BWP reconfiguration indication 926, or the BWP reconfiguration indication 936 indicating a reference signal bandwidth and a data bandwidth (such as one of the RS bandwidth and data bandwidth associated with one of the SPS and/or CG occasion configuration 710, 720, 730, or 740) and a time to transition to a different mode of operation.

Based on the indication transmitted at 1108 and/or the indications received at 1110 and/or 1112, the UE may transition to the second mode of operation and, at 1114, receive a data signal via the second data bandwidth and a reference signal via the second reference signal bandwidth. In some aspects, the reference signal may be a FMCW reference signal. For example, 1114 may be performed by application processor(s) 1406, cellular baseband processor(s) 1424, transceiver(s) 1422, antenna(s) 1480, and/or WB-to-NB mode adjustment component 198 of FIG. 14. In some aspects, the second reference signal bandwidth may be larger than the second data bandwidth, and the data signal may be associated with one or more periodic resource sets. Each of the one or more periodic resource sets, in some aspects, may include a first plurality of symbols, and the reference signal may be associated with one symbol in each of the one or more periodic resource sets or a second plurality of symbols in each of the one or more periodic resource sets.

At 1116, the UE may process the data signal and the reference signal via a single baseband processor. For example, 1116 may be performed by application processor(s) 1406, cellular baseband processor(s) 1424, and/or WB-to-NB mode adjustment component 198 of FIG. 14. The single baseband processor, in some aspects, may be a first baseband processor capable of processing a wideband data signal (e.g., if the second mode of operation is a normal mode of operation) or a second baseband processor that may be capable of processing a narrowband signal (and a wideband FMCW reference signal) but not capable of processing a wideband signal. For example, referring to FIGS. 6 and 9, the UE 904 may process, at 921 or 931, the WB FMCW RS transmission 918 and the NB SPS/CG data transmission 920, the WB FMCW RS transmission 928 and the NB SPS/CG data transmission 930, or the communication 938 using a same baseband processor such as the power saving mode reception architecture 620.

FIG. 12 is a flowchart 1200 of a method of wireless communication. The method may be performed by a base station (e.g., the base station 102, 902; the network entity 1402, 1502). In some aspects, the network device may receive, from a wireless device, an indication of a capability of the wireless device to process, with a same baseband processor, at least one reference signal using a larger bandwidth than an associated data signal. In some aspects, the at least one reference signal may be a FMCW reference signal. Referring to FIG. 9, for example, the base station 902 may, as part of configuring resources for a communication, receive an indication of a capability of a wireless device to use the power saving mode of operation associated with the WB FMCW RS and the NB data transmission within the set of WB SPS/CG configuration messages 906.

In some aspects, the network device may receive an indication of at least one timing gap associated with at least one of a first mode of operation and a second mode of operation. In some aspects, the network device may receive at least one of a second indication of a first minimum timing gap associated with a switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission (where a third data bandwidth associated with the data transmission is smaller than a third reference signal bandwidth associated with the reference signal transmission), or a fifth indication of a fourth minimum timing gap associated with a switch from the reference signal transmission to the data transmission (where the third data bandwidth associated with the data transmission is smaller than the third reference signal bandwidth associated with the reference signal transmission). For example, referring to FIGS. 6 and 9, the base station 902 may receive within the set of WB SPS/CG configuration messages 906 an indication of one or more of the set of minimum time gaps (e.g., $T_1$, $T_2$, $T_3$, and/or $T_4$ of FIG. 6).

The wireless device may detect a first condition related to energy available at the wireless device. In some aspects, the first condition related to the energy available at the network device may be associated with a battery power available at the network device being below a threshold amount of power. The first condition related to the energy available at the network device, in some aspects, may be associated with an ECHR at the network device. In some aspects, the first condition related to the energy available at the network device may be associated with both the battery power available at the network device and the ECHR at the network device. For example, referring to FIGS. 8 and 9, the UE 904 may detect at 910 (or 932) a triggering event that may be based on one or more thresholds associated with an ECHR and/or stored energy as described in relation to FIG. 8.

At 1206, the network device may, based on the wireless device detecting the first condition related to energy available at the wireless device, receive, from the wireless device, an indication to switch from a first mode of operation associated with a first data bandwidth and a first reference signal bandwidth to a second mode of operation associated with a second data bandwidth and a second reference signal bandwidth. For example, 1206 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, at least one of the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; and the first data bandwidth is smaller than the second data bandwidth and the first reference signal bandwidth is larger than the first data bandwidth. In some aspects, if the second data bandwidth is smaller than the second reference signal bandwidth, the indication received at 1206 may include an indication of the second data bandwidth in a set of one or more suitable or desired narrowband bandwidths. For example, referring to FIG. 9, the base station 902 may receive transition indication and/or request 912 or 934 indicating for the base station 902 to transmit an updated SPS and/or CG occasion configuration associated with the power saving mode of operation and/or to transition to (or from) the power saving mode of operation.

In some aspects, the network device may transmit an indication to activate the second reference signal bandwidth for a first time period. In some aspects, the indications transmitted may be received based on the indication received at 1206 to switch from the first mode of operation to the second mode of operation. For example, referring to FIG. 9, the base station 902 may transmit the BWP configuration indication 914, the NB BWP reconfiguration indication 926, or the BWP reconfiguration indication 936 indicating a reference signal bandwidth and a data bandwidth (such as one of the RS bandwidth and data bandwidth associated with one of the SPS and/or CG occasion configuration 710, 720, 730, or 740) and a time to transition to a different mode of operation.

Based on the indication received at 1206, the network device may transition to the second mode of operation and, at 1212, transmit a data signal via the second data bandwidth and a reference signal via the second reference signal bandwidth. In some aspects, the reference signal may be a FMCW reference signal. For example, 1212 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, the second reference signal bandwidth may be larger than the second data bandwidth, and the data signal may be associated with one or more periodic resource sets. Each of the one or more periodic resource sets, in some aspects, may include a first plurality of symbols, and the reference signal may be associated with one symbol in each of the one or more periodic resource sets or a second plurality of symbols in each of the one or more periodic resource sets.

In some aspects, the wireless device may process the data signal and the reference signal via a single baseband processor. The single baseband processor, in some aspects, may be a first baseband processor capable of processing a wideband data signal (e.g., if the second mode of operation is a normal mode of operation) or a second baseband processor that may be capable of processing a narrowband signal (and a wideband FMCW reference signal) but not capable of processing a wideband signal.

FIG. 13 is a flowchart 1300 of a method of wireless communication. The method may be performed by a base station (e.g., the base station 102, 902; the network entity 1402, 1502). At 1302, the network device may receive, from a wireless device, an indication of a capability of the wireless device to process, with a same baseband processor, at least one reference signal using a larger bandwidth than an associated data signal. For example, 1302 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, the at least one reference signal may be a FMCW reference signal. Referring to FIG. 9, for example, the base station 902 may, as part of configuring resources for a communication, receive an indication of a capability of a wireless device to use the power saving mode of operation associated with the WB FMCW RS and the NB data transmission within the set of WB SPS/CG configuration messages 906.

At 1304, the network device may receive an indication of at least one timing gap associated with at least one of a first mode of operation and a second mode of operation. For example, 1304 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, the network device may receive at least one of a second indication of a first minimum timing gap associated with a switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission (where a third data bandwidth associated with the data transmission is smaller than a third reference signal bandwidth associated with the reference signal transmission), or a fifth indication of a fourth minimum timing gap associated with a switch from the reference signal transmission to the data transmission (where the third data bandwidth associated with the data transmission is smaller than the third reference signal bandwidth associated with the reference signal transmission). For example, referring to FIGS. 6 and 9, the base station 902 may receive within the set of WB SPS/CG configuration messages 906 an indication of one or more of the set of minimum time gaps (e.g., $T_1$, $T_2$, $T_3$, and/or $T_4$ of FIG. 6).

The wireless device may detect a first condition related to energy available at the wireless device. In some aspects, the first condition related to the energy available at the network device may be associated with a battery power available at the network device being below a threshold amount of power. The first condition related to the energy available at the network device, in some aspects, may be associated with an ECHR at the network device. In some aspects, the first condition related to the energy available at the network device may be associated with both the battery power available at the network device and the ECHR at the network device. For example, referring to FIGS. 8 and 9, the UE 904 may detect at 910 (or 932) a triggering event that may be based on one or more thresholds associated with an ECHR and/or stored energy as described in relation to FIG. 8.

At 1306, the network device may, based on the wireless device detecting the first condition related to energy available at the wireless device, receive, from the wireless device, an indication to switch from a first mode of operation associated with a first data bandwidth and a first reference signal bandwidth to a second mode of operation associated with a second data bandwidth and a second reference signal bandwidth. For example, 1306 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, at least one of the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; and the first data bandwidth is smaller than the second data bandwidth and the first reference signal bandwidth is larger than the first data bandwidth. In some aspects, if the second data bandwidth is smaller than the second reference signal bandwidth, the indication received at 1306 may include an indication of the second data bandwidth in a set of one or more suitable or desired narrowband bandwidths. For example, referring to FIG. 9, the base station 902 may receive transition indication and/or request 912 or 934 indicating for the base station 902 to transmit an updated SPS and/or CG occasion configuration associated with the power saving mode of operation and/or to transition to (or from) the power saving mode of operation.

At 1308, the network device may transmit an indication to activate the second reference signal bandwidth for a first time period. At 1310, the network device may transmit an indication to activate the second data bandwidth during at least a portion of the first time period. For example, 1308 and 1310 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, the indications transmitted at 1308 and/or at 1310 may be received based on the indication received at 1306 to switch from the first mode of operation to the second mode of operation. For example, referring to FIG. 9, the base station 902 may transmit the BWP configuration indication 914, the NB BWP reconfiguration indication 926, or the BWP reconfiguration indication 936 indicating a reference signal bandwidth and a data bandwidth (such as one of the RS bandwidth and data bandwidth associated with one of the SPS and/or CG occasion configuration 710, 720, 730, or 740) and a time to transition to a different mode of operation.

Based on the indication received at 1306 and/or the indications transmitted at 1308 and/or 1310, the network device may transition to the second mode of operation and, at 1312, transmit a data signal via the second data bandwidth and a reference signal via the second reference signal bandwidth. In some aspects, the reference signal may be a FMCW reference signal. For example, 1312 may be performed by CU processor(s) 1512, DU processor(s) 1532, RU processor(s) 1542, transceiver(s) 1546, antenna(s) 1580, and/or WB-to-NB mode adjustment component 199 of FIG. 15. In some aspects, the second reference signal bandwidth may be larger than the second data bandwidth, and the data signal may be associated with one or more periodic resource sets. Each of the one or more periodic resource sets, in some aspects, may include a first plurality of symbols, and the reference signal may be associated with one symbol in each of the one or more periodic resource sets or a second plurality of symbols in each of the one or more periodic resource sets.

In some aspects, the wireless device may process the data signal and the reference signal via a single baseband processor. The single baseband processor, in some aspects, may be a first baseband processor capable of processing a wideband data signal (e.g., if the second mode of operation is a normal mode of operation) or a second baseband processor that may be capable of processing a narrowband signal (and a wideband FMCW reference signal) but not capable of processing a wideband signal.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize one or more antennas 1480 for communication. The cellular baseband processor(s) 1424 communicates through the transceiver(s) 1422 via the one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the WB-to-NB mode adjustment component 198 may be configured to detect a first trigger condition at the wireless device and transmit, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth. The WB-to-NB mode adjustment component 198 may be within the cellular baseband processor(s) 1424, the application processor(s) 1406, or both the cellular baseband processor(s) 1424 and the application processor(s) 1406. The WB-to-NB mode adjustment component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for detecting a first trigger condition at the wireless device. The apparatus 1404, and in particular the cellular baseband processor(s) 1424 and/or the application processor(s) 1406, may include means for transmitting, for a network device, a first indication to switch from a first mode of operation associated with a first data bandwidth and a first reference signal bandwidth to a second mode of operation associated with a second data bandwidth and a second reference signal bandwidth. The apparatus 1404, and in particular the cellular baseband processor(s) 1424 and/or the application processor(s) 1406, may include means for receiving a data signal via the second data bandwidth and a reference signal via the second reference signal bandwidth. The apparatus 1404, and in particular the cellular baseband processor(s) 1424 and/or the application processor(s) 1406, may include means for processing the data signal and the reference signal via a single baseband processor. The apparatus 1404, and in particular the cellular baseband processor(s) 1424 and/or the application processor(s) 1406, may include means for transmitting at least one of: a second indication of a first minimum timing gap associated with the switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission, or a fifth indication of a fourth minimum timing gap associated with a switch from the reference signal transmission to the data transmission. The apparatus 1404, and in particular the cellular baseband processor(s) 1424 and/or the application processor(s) 1406, may include means for transmitting a second indication of a capability to process, with a same baseband processor, at least one reference signal using a larger bandwidth than an associated data signal. The apparatus 1404, and in particular the cellular baseband processor(s) 1424 and/or the application processor(s) 1406, may include means for receiving a second indication to activate the second reference signal bandwidth for a first time period. The apparatus 1404, and in particular the cellular baseband processor(s) 1424 and/or the application processor(s) 1406, may include means for receiving a third indication to activate the second data bandwidth during at least a portion of the first time period. The apparatus 1404 may further include means for performing any of the aspects described in connection with the flowcharts in FIG. 10 or 11, and/or performed by the UE in the communication flow of FIG. 9. The means may be the WB-to-NB mode adjustment component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
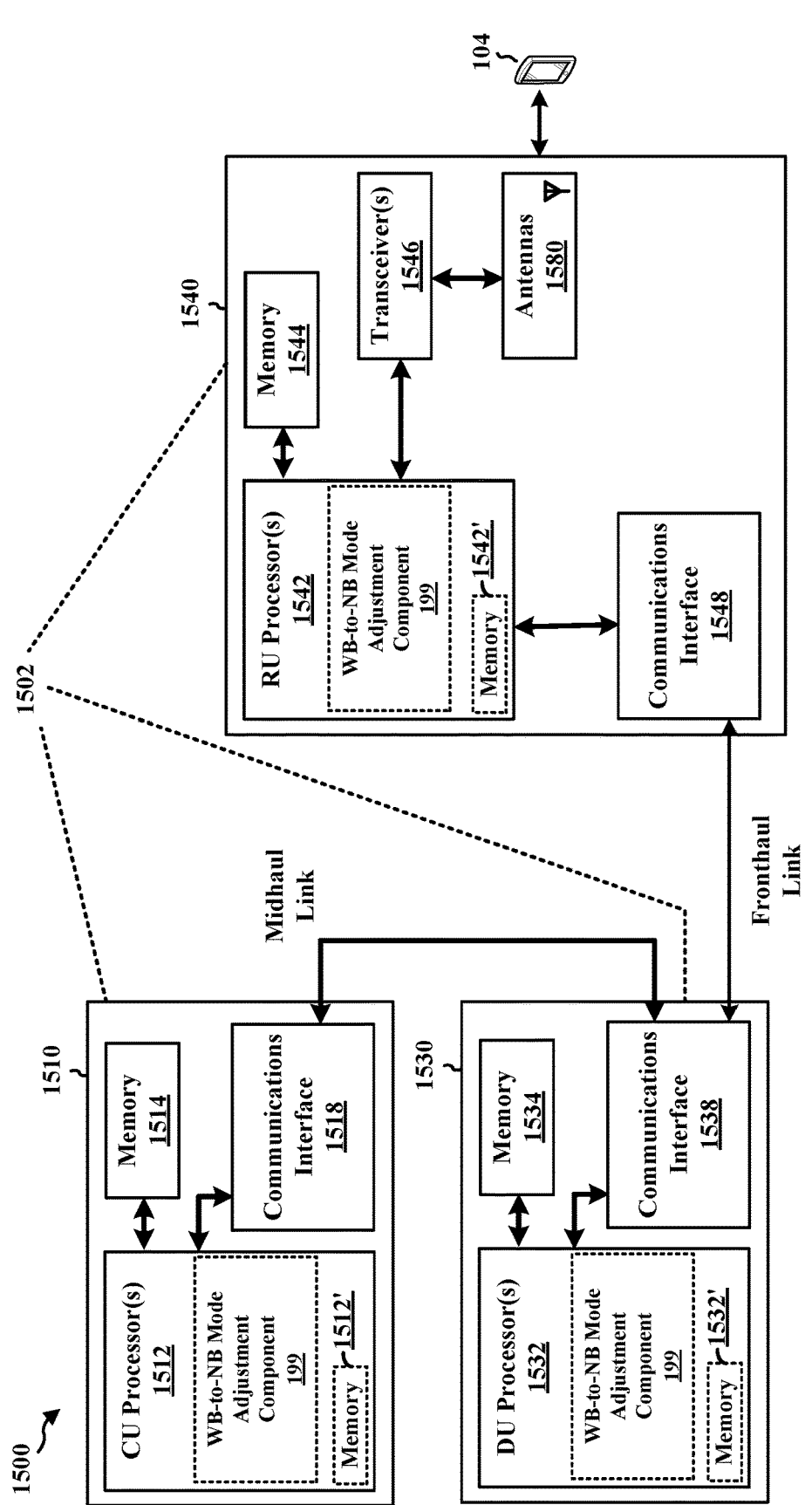
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the WB-to-NB mode adjustment component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, one or more antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra.

The computer-readable medium/memory may also be used for storing data that is manipulated by the processor(s) when executing software.

As discussed supra, the WB-to-NB mode adjustment component 199 may be configured to receive, from a wireless device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth. The WB-to-NB mode adjustment component 199 may further be configured to transmit, for the wireless device, a data signal via the second data bandwidth and a reference signal via the second reference signal bandwidth. The WB-to-NB mode adjustment component 199 may be within one or more processors of one or more of the CU 1510, DU 1530, and the RU 1540. The WB-to-NB mode adjustment component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for receiving, from a wireless device, a first indication to switch from a first mode of operation associated with a first data bandwidth and a first reference signal bandwidth to a second mode of operation associated with a second data bandwidth and a second reference signal bandwidth. The network entity 1502 may include means for transmitting, for the wireless device, a data signal via the second data bandwidth and a reference signal via the second reference signal bandwidth. The network entity 1502 may include means for receiving at least one of a second indication of a first minimum timing gap associated with the switch from the first mode of operation to the second mode of operation, a third indication of a second minimum timing gap associated with a switch from the second mode of operation to the first mode of operation, a fourth indication of a third minimum timing gap associated with a switch from a data transmission to a reference signal transmission, or a fifth indication of a fourth minimum timing gap associated with a switch from the reference signal transmission to the data transmission. The network entity 1502 may include means for receiving a second indication of a capability of the wireless device to process, with a same baseband processor, at least one reference signal using a larger bandwidth than an associated data signal. The network entity 1502 may include means for transmitting a second indication to activate the second reference signal bandwidth for a first time period. The network entity 1502 may include means for transmitting a third indication to activate the second data bandwidth during at least a portion of the first time period. The network entity 1502 may further include means for performing any of the aspects described in connection with the flowchart in FIGS. 12 and 13, and/or performed by the base station in the communication flow of FIG. 9. The means may be the WB-to-NB mode adjustment component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 12 and 13.

Various aspects relate generally to power saving for a wideband-capable (or ultra-wideband-capable) wireless device. Some aspects more specifically relate to switching between wideband and narrowband modes of operation for power saving in association with a configured grant or semi-persistent scheduling transmission while maintaining a wideband FMCW-based RS to identify a suitable or desired sub-band. In some examples, the method may include detecting a first trigger condition at the wireless device and transmitting, for a network device, a first indication to switch from a first mode of operation associated with a first data bandwidth and a first reference signal bandwidth to a second mode of operation associated with a second data bandwidth and a second reference signal bandwidth, where at least one of the second data bandwidth is smaller than the first data bandwidth and the second reference signal bandwidth is larger than the second data bandwidth, the first data bandwidth is smaller than the first reference signal bandwidth and the second data bandwidth is smaller than the second reference signal bandwidth, or the first data bandwidth is smaller than the second data bandwidth and the first reference signal bandwidth is larger than the first data bandwidth.

Particular aspects of the subject matter described in this disclosure can be implemented to realize one or more of the following potential advantages. In some examples, by enabling a switching between a wideband mode of data transmission and a narrowband mode of data transmission while maintaining a wideband mode for RS operation, the described techniques can be used to manage power consumption at a wideband-capable wireless device.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device comprising: detecting a first trigger condition at the wireless device; and transmitting, for a network device, a first indication to switch from a first mode of operation associated with a first data bandwidth and a first reference signal bandwidth to a second mode of operation associated with a second data bandwidth and a second reference signal bandwidth, wherein at least one of: the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; or the first data bandwidth is smaller than the second data bandwidth and the first reference signal bandwidth is larger than the first data bandwidth.

Aspect 2 is the method of aspect 1, further comprising: receiving a data signal via the second data bandwidth and a reference signal via the second reference signal bandwidth; and processing the data signal and the reference signal using a single baseband processor.

Aspect 3 is the method of aspect 2, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

Aspect 4 is the method of any of aspects 1 to 3, wherein the first trigger condition is related to an energy available at the wireless device and is associated with a battery power available at the wireless device being below a threshold amount of power.

Aspect 5 is the method of any of aspects 1 to 4, wherein the first trigger condition is related to an energy available at the wireless device and is associated with an energy-consumption-to-harvesting ratio at the wireless device.

Aspect 6 is the method of any of aspects 1 to 5, further comprising transmitting at least one of: a second indication of a first minimum timing gap associated with the switch from the first mode of operation to the second mode of operation; a third indication of a second minimum timing gap associated with a switch from the second mode of operation to the first mode of operation; a fourth indication of a third minimum timing gap associated with a switch from a data transmission to a reference signal transmission, wherein a third data bandwidth associated with the data transmission is smaller than a third reference signal bandwidth associated with the reference signal transmission; or a fifth indication of a fourth minimum timing gap associated with a switch from the reference signal transmission to the data transmission, wherein the third data bandwidth associated with the data transmission is smaller than the third reference signal bandwidth associated with the reference signal transmission.

Aspect 7 is the method of any of aspects 1 to 6, further comprising: transmitting a second indication of a capability to process, with a same baseband processor, at least one reference signal using a larger bandwidth than an associated data signal.

Aspect 8 is the method of aspect 7, wherein the at least one reference signal comprises a frequency modulated continuous wave (FMCW) reference signal.

Aspect 9 is the method of any of aspects 1 to 8, wherein the second reference signal bandwidth is larger than the second data bandwidth, further comprising: receiving a second indication to activate the second reference signal bandwidth for a first time period; and receiving a third indication to activate the second data bandwidth during at least a portion of the first time period.

Aspect 10 is a method of wireless communication at a network device comprising: receiving, from a wireless device, a first indication to switch from a first mode of operation associated with a first data bandwidth and a first reference signal bandwidth to a second mode of operation associated with a second data bandwidth and a second reference signal bandwidth, wherein at least one of: the second data bandwidth is smaller than the first data bandwidth and the second reference signal bandwidth is larger than the second data bandwidth; the first data bandwidth is smaller than the first reference signal bandwidth and the second data bandwidth is smaller than the second reference signal bandwidth; or the first data bandwidth is smaller than the second data bandwidth and the first reference signal bandwidth is larger than the first data bandwidth; and transmitting, for the wireless device, a data signal via the second data bandwidth and a reference signal via the second reference signal bandwidth.

Aspect 11 is the method of aspect 10, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

Aspect 12 is the method of any of aspects 10 and 11, further comprising receiving at least one of: a second indication of a first minimum timing gap associated with the switch from the first mode of operation to the second mode of operation; a third indication of a second minimum timing gap associated with a switch from the second mode of operation to the first mode of operation; a fourth indication of a third minimum timing gap associated with a switch from a data transmission to a reference signal transmission, wherein a third data bandwidth associated with the data transmission is smaller than a third reference signal bandwidth associated with the reference signal transmission; or a fifth indication of a fourth minimum timing gap associated with a switch from the reference signal transmission to the data transmission, wherein the third data bandwidth associated with the data transmission is smaller than the third reference signal bandwidth associated with the reference signal transmission.

Aspect 13 is the method of any of aspects 10 to 12, further comprising: receiving a second indication of a capability of the wireless device to process, with a same baseband processor, at least one reference signal using a larger bandwidth than an associated data signal.

Aspect 14 is the method of aspect 13, wherein the at least one reference signal comprises a frequency modulated continuous wave (FMCW) reference signal.

Aspect 15 is the method of any of aspects 10 to 14, wherein the second reference signal bandwidth is larger than the second data bandwidth, further comprising: transmitting a second indication to activate the second reference signal bandwidth for a first time period; and transmitting a third indication to activate the second data bandwidth during at least a portion of the first time period.

Aspect 16 is one of a wireless device or an apparatus for wireless communication at a wireless device, including a memory and at least one processor coupled to the memory and, based at least in part on information stored in the memory, the at least one processor is configured to implement any of aspects 1 to 9.

Aspect 17 is one of the wireless device or the apparatus of aspect 16, further including a transceiver or an antenna coupled to the at least one processor.

Aspect 18 is one of a wireless device or an apparatus for wireless communication at a wireless device including means for implementing any of aspects 1 to 9.

Aspect 19 is a computer-readable medium (e.g., a non-transitory computer-readable medium) storing computer executable code, where the code when executed by a processor causes the processor to implement any of aspects 1 to 9.

Aspect 20 is one of a network device or an apparatus for wireless communication at a network device including a memory and at least one processor coupled to the memory and, based at least in part on information stored in the memory, the at least one processor is configured to implement any of aspects 10 to 15.

Aspect 21 is the network device or the apparatus of aspect 20, further including a transceiver or an antenna coupled to the at least one processor.

Aspect 22 is a network device or an apparatus for wireless communication at a device including means for implementing any of aspects 1 to 10 to 15.

Aspect 23 is a computer-readable medium (e.g., a non-transitory computer-readable medium) storing computer executable code, where the code when executed by a processor causes the processor to implement any of aspects 10 to 15.

What is claimed is:

1. A wireless device, comprising:
at least one memory; and
at least one processor coupled to the at least one memory and, based at least in part on stored information that is stored in the at least one memory, the at least one processor, individually or in any combination, is configured to:
    detect a first trigger condition at the wireless device; and
    transmit, for a network device, a first indication to switch from a first mode of operation associated with a first data bandwidth and a first reference signal bandwidth to a second mode of operation associated with a second data bandwidth and a second reference signal bandwidth, wherein at least one of:
        the second data bandwidth is smaller than the first data bandwidth and the second reference signal bandwidth is larger than the second data bandwidth;
        the first data bandwidth is smaller than the first reference signal bandwidth and the second data bandwidth is smaller than the second reference signal bandwidth; or
        the first data bandwidth is smaller than the second data bandwidth and the first reference signal bandwidth is larger than the first data bandwidth.

2. The wireless device of claim 1, wherein the at least one processor, individually or in any combination, is further configured to:
    receive a data signal via the second data bandwidth and a reference signal via the second reference signal bandwidth; and
    process the data signal and the reference signal using a single baseband processor.

3. The wireless device of claim 2, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

4. The wireless device of claim 1, wherein the first trigger condition is related to an energy available at the wireless device and is associated with a battery power available at the wireless device being below a threshold amount of power.

5. The wireless device of claim 1, wherein the first trigger condition is related to an energy available at the wireless device and is associated with an energy-consumption-to-harvesting ratio at the wireless device.

6. The wireless device of claim 1, wherein the at least one processor, individually or in any combination, is further configured to transmit at least one of:
    a second indication of a first minimum timing gap associated with the switch from the first mode of operation to the second mode of operation;
    a third indication of a second minimum timing gap associated with a switch from the second mode of operation to the first mode of operation;
    a fourth indication of a third minimum timing gap associated with a switch from a data transmission to a reference signal transmission, wherein a third data bandwidth associated with the data transmission is smaller than a third reference signal bandwidth associated with the reference signal transmission; or
    a fifth indication of a fourth minimum timing gap associated with a switch from the reference signal transmission to the data transmission, wherein the third data bandwidth associated with the data transmission is smaller than the third reference signal bandwidth associated with the reference signal transmission.

7. The wireless device of claim 1, wherein the at least one processor, individually or in any combination, is further configured to:
    transmit a second indication of a capability to process, with a same baseband processor, at least one reference signal using a larger bandwidth than an associated data signal.

8. The wireless device of claim 7, wherein the at least one reference signal comprises a frequency modulated continuous wave (FMCW) reference signal.

9. The wireless device of claim 1, further comprising a transceiver coupled to the at least one processor, wherein the second reference signal bandwidth is larger than the second data bandwidth, and wherein the at least one processor, individually or in any combination, is further configured to:
    receive, via the transceiver, a second indication to activate the second reference signal bandwidth for a first time period; and
    receive a third indication to activate the second data bandwidth during at least a portion of the first time period.

10. A network device, comprising:
at least one memory; and
at least one processor coupled to the at least one memory and, based at least in part on stored information that is stored in the at least one memory, the at least one processor, individually or in any combination, is configured to:
    receive, from a wireless device, a first indication to switch from a first mode of operation associated with a first data bandwidth and a first reference signal bandwidth to a second mode of operation associated with a second data bandwidth and a second reference signal bandwidth, wherein at least one of:

the second data bandwidth is smaller than the first data bandwidth and the second reference signal bandwidth is larger than the second data bandwidth;

the first data bandwidth is smaller than the first reference signal bandwidth and the second data bandwidth is smaller than the second reference signal bandwidth; or the first data bandwidth is smaller than the second data bandwidth and the first reference signal bandwidth is larger than the first data bandwidth; and transmit, for the wireless device, a data signal via the second data bandwidth and a reference signal via the second reference signal bandwidth.

11. The network device of claim 10, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

12. The network device of claim 10, wherein the at least one processor, individually or in any combination, is further configured to receive at least one of:

a second indication of a first minimum timing gap associated with the switch from the first mode of operation to the second mode of operation;

a third indication of a second minimum timing gap associated with a switch from the second mode of operation to the first mode of operation;

a fourth indication of a third minimum timing gap associated with a switch from a data transmission to a reference signal transmission, wherein a third data bandwidth associated with the data transmission is smaller than a third reference signal bandwidth associated with the reference signal transmission; or a fifth indication of a fourth minimum timing gap associated with a switch from the reference signal transmission to the data transmission, wherein the third data bandwidth associated with the data transmission is smaller than the third reference signal bandwidth associated with the reference signal transmission.

13. The network device of claim 10, wherein the at least one processor, individually or in any combination, is further configured to:

receive a second indication of a capability of the wireless device to process, with a same baseband processor, at least one reference signal using a larger bandwidth than an associated data signal.

14. The network device of claim 13, wherein the at least one reference signal comprises a frequency modulated continuous wave (FMCW) reference signal.

15. The network device of claim 10, further comprising a transceiver coupled to the at least one processor, wherein the second reference signal bandwidth is larger than the second data bandwidth, and the at least one processor, individually or in any combination, is further configured to:

transmit, via the transceiver, a second indication to activate the second reference signal bandwidth for a first time period; and transmit a third indication to activate the second data bandwidth during at least a portion of the first time period.

16. A method of wireless communication at a wireless device, comprising:

detecting a first trigger condition at the wireless device; and transmitting, for a network device, a first indication to switch from a first mode of operation associated with a first data bandwidth and a first reference signal bandwidth to a second mode of operation associated with a second data bandwidth and a second reference signal bandwidth, wherein at least one of:

the second data bandwidth is smaller than the first data bandwidth and the second reference signal bandwidth is larger than the second data bandwidth;

the first data bandwidth is smaller than the first reference signal bandwidth and the second data bandwidth is smaller than the second reference signal bandwidth; or the first data bandwidth is smaller than the second data bandwidth and the first reference signal bandwidth is larger than the first data bandwidth.

17. The method of claim 16, further comprising:

receiving a data signal via the second data bandwidth and a reference signal via the second reference signal bandwidth; and processing the data signal and the reference signal via a single baseband processor.

18. The method of claim 17, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

19. The method of claim 16, wherein the first trigger condition is related to an energy available at the wireless device and is associated with a battery power available at the wireless device being below a threshold amount of power.

20. The method of claim 16, wherein the first trigger condition is related to an energy available at the wireless device and is associated with an energy-consumption-to-harvesting ratio at the wireless device.

21. The method of claim 16, further comprising transmitting at least one of:

a second indication of a first minimum timing gap associated with the switch from the first mode of operation to the second mode of operation;

a third indication of a second minimum timing gap associated with a switch from the second mode of operation to the first mode of operation;

a fourth indication of a third minimum timing gap associated with a switch from a data transmission to a reference signal transmission, wherein a third data bandwidth associated with the data transmission is smaller than a third reference signal bandwidth associated with the reference signal transmission; or a fifth indication of a fourth minimum timing gap associated with a switch from the reference signal transmission to the data transmission, wherein the third data bandwidth associated with the data transmission is smaller than the third reference signal bandwidth associated with the reference signal transmission.

22. The method of claim 16, further comprising:

transmitting a second indication of a capability to process, with a same baseband processor, at least one reference signal using a larger bandwidth than an associated data signal.

23. The method of claim 22, wherein the at least one reference signal comprises a frequency modulated continuous wave (FMCW) reference signal.

24. The method of claim 16, wherein the second reference signal bandwidth is larger than the second data bandwidth, further comprising:

receiving a second indication to activate the second reference signal bandwidth for a first time period; and receiving a third indication to activate the second data bandwidth during at least a portion of the first time period.

25. A method of wireless communication at a network device, comprising:

receiving, from a wireless device, a first indication to switch from a first mode of operation associated with a first data bandwidth and a first reference signal bandwidth to a second mode of operation associated with a second data bandwidth and a second reference signal bandwidth, wherein at least one of:

the second data bandwidth is smaller than the first data bandwidth and the second reference signal bandwidth is larger than the second data bandwidth;

the first data bandwidth is smaller than the first reference signal bandwidth and the second data bandwidth is smaller than the second reference signal bandwidth; or the first data bandwidth is smaller than the second data bandwidth and the first reference signal bandwidth is larger than the first data bandwidth; and transmitting, for the wireless device, a data signal via the second data bandwidth and a reference signal via the second reference signal bandwidth.

26. The method of claim 25, wherein the second reference signal bandwidth is larger than the second data bandwidth, wherein the data signal is associated with one or more periodic resource sets, wherein each of the one or more periodic resource sets comprises a first plurality of symbols, and wherein the reference signal is associated with one symbol in each of the one or more periodic resource sets or a second plurality of symbols in each of the one or more periodic resource sets.

27. The method of claim 25, further comprising receiving at least one of:

a second indication of a first minimum timing gap associated with the switch from the first mode of operation to the second mode of operation;

a third indication of a second minimum timing gap associated with a switch from the second mode of operation to the first mode of operation;

a fourth indication of a third minimum timing gap associated with a switch from a data transmission to a reference signal transmission, wherein a third data bandwidth associated with the data transmission is smaller than a third reference signal bandwidth associated with the reference signal transmission; or a fifth indication of a fourth minimum timing gap associated with a switch from the reference signal transmission to the data transmission, wherein the third data bandwidth associated with the data transmission is smaller than the third reference signal bandwidth associated with the reference signal transmission.

28. The method of claim 25, further comprising:

receiving a second indication of a capability of the wireless device to process, with a same baseband processor, at least one reference signal using a larger bandwidth than an associated data signal.

29. The method of claim 28, wherein the at least one reference signal comprises a frequency modulated continuous wave (FMCW) reference signal.

30. The method of claim 25, wherein the second reference signal bandwidth is larger than the second data bandwidth, further comprising:

transmitting a second indication to activate the second reference signal bandwidth for a first time period; and transmitting a third indication to activate the second data bandwidth during at least a portion of the first time period.

* * * * *